United States Patent
Lee et al.

(10) Patent No.: US 7,411,587 B2
(45) Date of Patent: Aug. 12, 2008

(54) METHOD AND APPARATUS FOR THREE-DIMENSIONALLY TRANSFORMING TWO-DIMENSIONAL LINEAR DATA IN ACCORDANCE WITH THREE-DIMENSIONAL TOPOGRAPHY DATA IN REAL TIME AND METHOD AND APPARATUS FOR THREE-DIMENSIONALLY VISUALIZING TWO-DIMENSIONAL LINEAR DATA TOGETHER WITH THREE-DIMENSIONAL TOPOGRAPHY DATA IN REAL TIME

(75) Inventors: Shinjun Lee, Seoul (KR); Dokyoon Kim, Seongnam-si (KR); Keechang Lee, Yongin-si (KR); Jeonghwan Ahn, Suwon-si (KR); Heesae Lee, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 379 days.

(21) Appl. No.: 11/200,197

(22) Filed: Aug. 10, 2005

(65) Prior Publication Data

US 2006/0129320 A1 Jun. 15, 2006

(30) Foreign Application Priority Data

Dec. 14, 2004 (KR) ...................... 10-2004-0105651

(51) Int. Cl.
*G06T 15/00* (2006.01)
(52) U.S. Cl. ....................... 345/419; 345/426; 345/428; 345/619; 701/208
(58) Field of Classification Search ................. 345/419, 345/426, 428, 619; 701/208
See application file for complete search history.

(56) References Cited

U.S. PATENT DOCUMENTS 6,622,085 B1 *   9/2003   Amita et al. ................. 701/208
6,917,877 B2 *   7/2005   Yang .......................... 701/208
7,023,432 B2 *   4/2006   Fletcher et al. ............. 345/419

FOREIGN PATENT DOCUMENTS

KR   10-2000-0043733   7/2000

* cited by examiner

*Primary Examiner*—Phu K Nguyen
(74) *Attorney, Agent, or Firm*—Staas & Halsey LLP

(57) ABSTRACT

A method and apparatus for three-dimensionally transforming two-dimensional linear data in real time and a method and apparatus for three-dimensionally visualizing the two-dimensional linear data in real time. The method of three-dimensionally transforming two-dimensional linear data in real time includes: searching triangles in which vertexes constituting the two-dimensional linear data are contained among triangles constituting the three-dimensional topography data; calculating heights of the vertexes by using three-dimensional coordinates of the searched triangles; calculating intersection points between the triangles constituting the three-dimensional topography data and straight lines constituting the two-dimensional linear data; and calculating heights of the calculated intersection points. The two-dimensional linear data is three-dimensionally transformed in accordance with three-dimensional topography data in real time and three-dimensionally visualized together with three-dimensional topography data in real time, so that map information can be perceived intuitively and conveniently by a user.

56 Claims, 19 Drawing Sheets

DEM

TIN

AVERAGE HEIGHT OF ANGULAR POINTS 1, 2, 3, AND 4

HEIGHT OF PLANE (1, 2, 3)

HEIGHT OF PLANE (2, 3, 4)

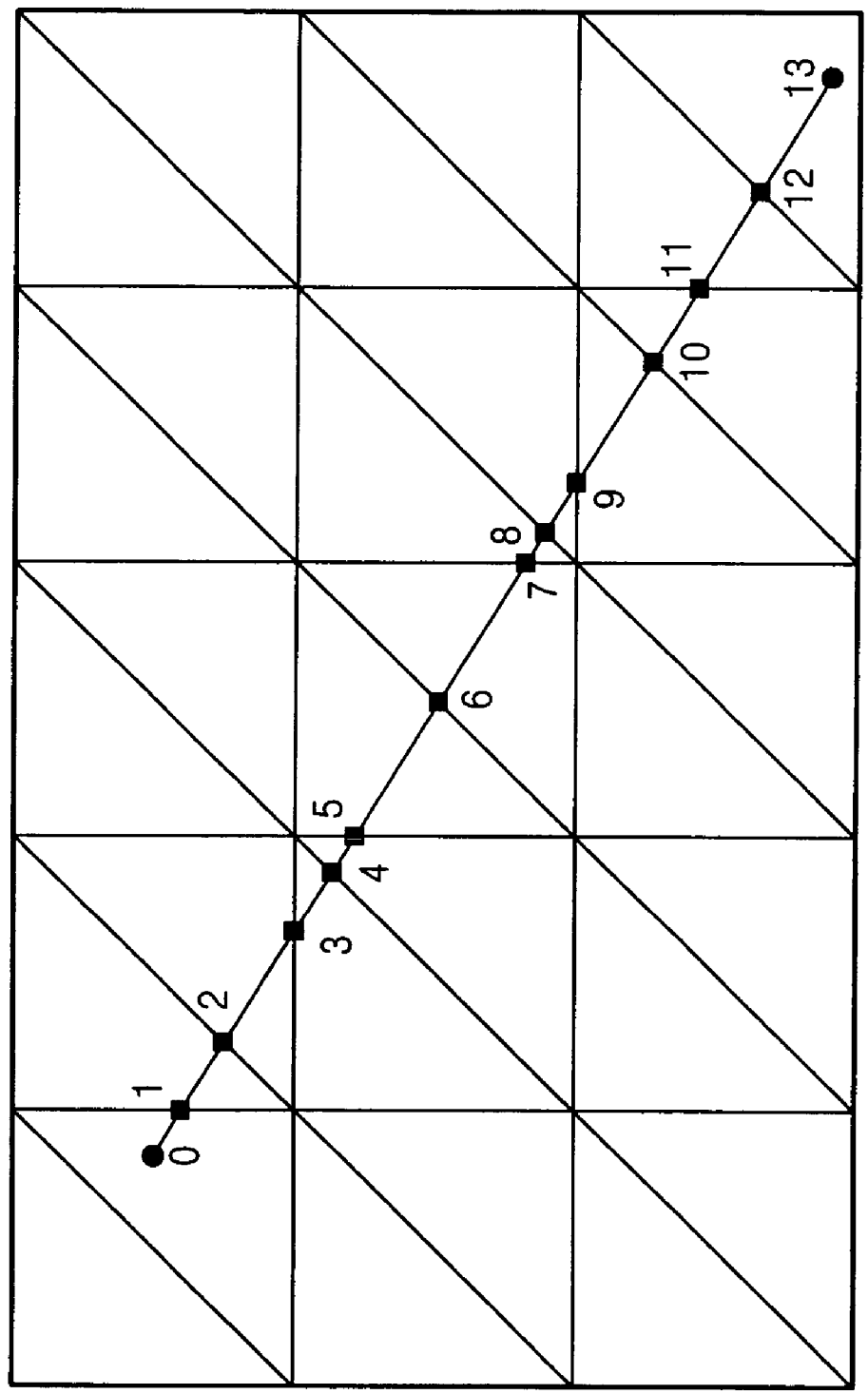

METHOD AND APPARATUS FOR THREE-DIMENSIONALLY TRANSFORMING TWO-DIMENSIONAL LINEAR DATA IN ACCORDANCE WITH THREE-DIMENSIONAL TOPOGRAPHY DATA IN REAL TIME AND METHOD AND APPARATUS FOR THREE-DIMENSIONALLY VISUALIZING TWO-DIMENSIONAL LINEAR DATA TOGETHER WITH THREE-DIMENSIONAL TOPOGRAPHY DATA IN REAL TIME

CROSS-REFERENCE TO RELATED APPLICATION

This application claims the benefit of Korean Patent Application No. 2004-0105651, filed on Dec. 14, 2004, in the Korean Intellectual Property Office, the disclosure of which is incorporated herein by reference.

BACKGROUND OF THE INVENTION

1. Field of the Invention

The present invention relates to car navigation, and more particularly, to a method and apparatus for three-dimensionally transforming two-dimensional linear data in accordance with three-dimensional topography data in real time and a method and apparatus for three-dimensionally visualizing two-dimensional linear data together with three-dimensional topography data in real time.

2. Description of Related Art

Recently, increase in the number of cars on roads has caused a serious problem of traffic congestion. In order to solve the traffic congestion, there have been developed car navigation systems. The car navigation system has basic functions of tracking a position of a car and displaying the position on a road map. The car navigation system has additional functions of monitoring traffic situation of roads and providing the traffic situation information to drivers.

A well-visualized car navigation system enables the drivers to accurately locate their destination on the road map. In addition, when a car travels at a high speed, a three-dimensionally visualized road map of the car navigation system provides more convenience and safety to a driver than a two-dimensional map. Buildings and geographical features are depicted three-dimensionally on the three-dimensionally visualized road map, so that the driver can perceive them intuitively.

Conventional car navigation systems store two-dimensional linear data and visualize the data two-dimensionally.

There is an approach for three-dimensionally displaying two-dimensional map data with use of perspective as shown in FIG. 1. In this approach, distances or lengths in the two-dimensional linear data are differently displayed on the map according to a user's viewing point to provide perspective to the map. For example, the same lengths b1 and b2 on a plan S are displayed with different lengths d1 and d2 on a plan P according to the distances between the user's viewing point B and the lengths d1 and d2. In the approach, the two-dimensional linear data cannot be transformed into the three-dimensional topography data with reality. In addition, in the approach, road data which changes according to the three-dimensional topography data is not considered.

Conventional navigation systems cannot obtain or store three-dimensional data due to their map data collecting methods. In general, the map data is collected with airplane photography, and two-dimensional map is obtained from the map data.

National Geographic Information Institute collecting and managing topography data transforms the topography data into three-dimensional topography data. However, the three-dimensional topography data does not include three-dimensional data of buildings, roads, and so on. Therefore, in order to completely visualize all geography features on the map, it is necessary to a method of three-dimensionally transforming the two-dimensional linear data of the buildings and roads in accordance with three-dimensional-topography data in real time and three-dimensionally visualizing two-dimensional linear data together with three-dimensional topography data in real time.

BRIEF SUMMARY

An aspect of the present invention provides a method and apparatus for three-dimensionally transforming two-dimensional linear data in accordance with three-dimensional topography data in real time and a method and apparatus for three-dimensionally visualizing two-dimensional linear data together with three-dimensional topography data in real time.

An aspect of the present invention also provides a computer-readable medium having embodied thereon a computer program for a method of three-dimensionally transforming two-dimensional linear data in accordance with three-dimensional topography data in real time and a method of three-dimensionally visualizing two-dimensional linear data together with three-dimensional topography data in real time.

According to an aspect of the present invention, there is provided a method of three-dimensionally transforming two-dimensional linear data in accordance with three-dimensional topography data in real time, including: searching triangles in which vertexes constituting the two-dimensional linear data are contained among triangles constituting the three-dimensional topography data; calculating heights of the vertexes by using three-dimensional coordinates of the searched triangles; calculating intersection points between the triangles constituting the three-dimensional topography data and straight lines constituting the two-dimensional linear data; and calculating heights of the calculated intersection points.

According to another aspect of the present invention, there is provided an apparatus for three-dimensionally transforming two-dimensional linear data in accordance with three-dimensional topography data in real time, including: a triangle search unit searching triangles in which vertexes constituting the two-dimensional linear data are contained among triangles constituting the three-dimensional topography data; a vertex height calculation unit calculating heights of the vertexes by using three-dimensional coordinates of the searched triangles; an intersection point calculation unit calculating intersection points between the triangles constituting the three-dimensional topography data and straight lines constituting the two-dimensional linear data; and an intersection point height calculation unit calculating heights of the calculated intersection points.

According to still another aspect of the present invention, there is provided a method of three-dimensionally visualizing two-dimensional linear data together with three-dimensional topography data, including: searching triangles in which vertexes constituting the two-dimensional linear data are contained among triangles constituting the three-dimensional topography data; calculating heights of the vertexes by using three-dimensional coordinates of the searched triangles; calculating intersection points between the triangles constituting the three-dimensional topography data and straight lines constituting the two-dimensional linear data; calculating heights of the calculated intersection points; and outputting the two-dimensional linear data in a three-dimensional format by using the three-dimensional coordinates of the vertexes and the three-dimensional coordinates of the intersection points.

According to yet another aspect of the present invention, there is provided an apparatus for three-dimensionally visualizing two-dimensional linear data together with three-dimensional topography data, including: a triangle search unit searching triangles in which vertexes constituting the two-dimensional linear data are contained among triangles constituting the three-dimensional topography data; a vertex height calculation unit calculating heights of the vertexes by using three-dimensional coordinates of the searched triangles; an intersection point calculation unit calculating intersection points between the triangles constituting the three-dimensional topography data and straight lines constituting the two-dimensional linear data; an intersection point height calculation unit calculating heights of the calculated intersection points; and a data output unit storing the three-dimensional coordinates of the vertexes and the three-dimensional coordinates of the intersection points and outputting the two-dimensional linear data in a three-dimensional format by using the three-dimensional coordinates of the vertexes and the three-dimensional coordinates of the intersection points.

According to other aspects of the present invention, there are computer-readable media having computer programs for performing the aforementioned methods.

Additional and/or other aspects and advantages of the present invention will be set forth in part in the description which follows and, in part, will be obvious from the description, or may be learned by practice of the invention.

BRIEF DESCRIPTION OF THE DRAWINGS

The above and/or other aspects and advantages of the present invention will become apparent and more readily appreciated from the following detailed description, taken in conjunction with the accompanying drawings of which:

FIG. 15 is a view showing intersection points between the straight line and the boundary lines arranged in an order of a distance from one end point of the straight line;

DETAILED DESCRIPTION OF EMBODIMENTS

Figure 1:
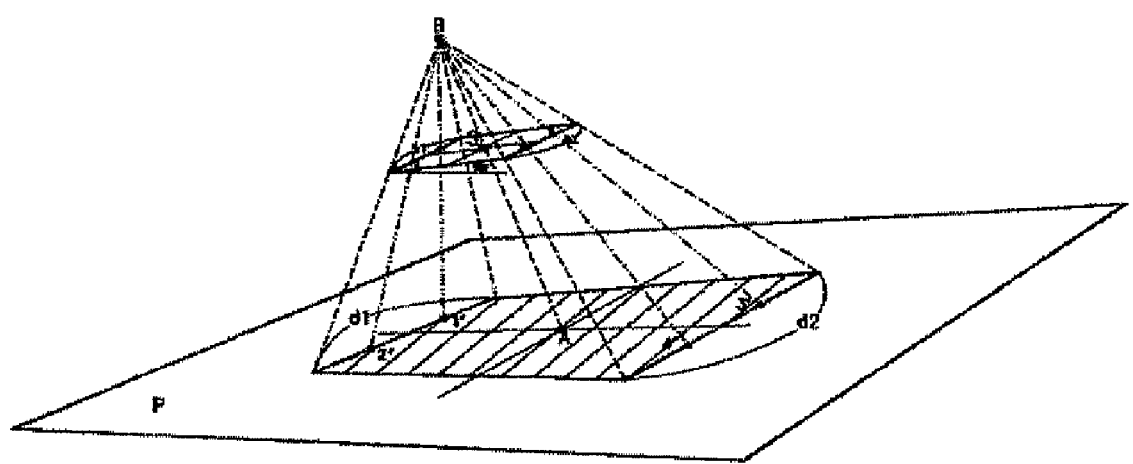
FIG. 1 is a visualization method in a conventional navigation system.

Reference will now be made in detail to embodiments of the present invention, examples of which are illustrated in the accompanying drawings, wherein like reference numerals refer to the like elements throughout. The embodiments are described below in order to explain the present invention by referring to the figures.

Figure 2:
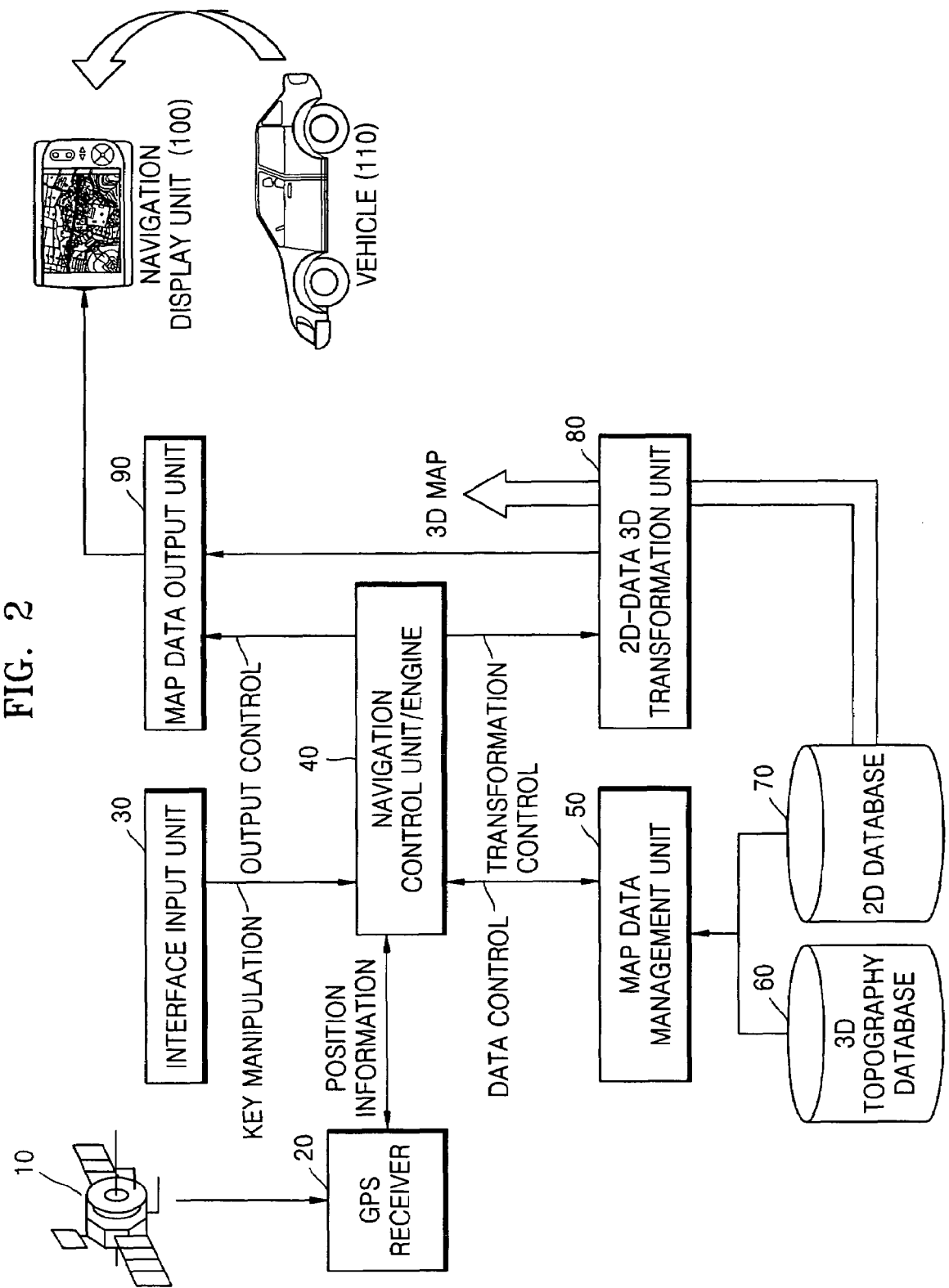
FIG. 2 is a block diagram showing a construction of a navigation system according to an embodiment of the present invention.

FIG. 2 is a block diagram showing a construction of a navigation system according to an embodiment of the present invention.

The navigation system includes a global positioning system (GPS) receiver 20, an interface input unit 30, a navigation control unit 40, a map data management unit 50, a three-dimensional topography database 60, two-dimensional database 70, a two-dimensional-data three-dimensional transformation unit 80, a map data output 90, and a navigation display unit 100. The navigation system is located in a vehicle 110.

When a satellite 10 transmits position information to the navigation system, the GPS receiver 20 transfers the received position information to the navigation control unit 40.

A user inputs a request to the interface input unit 30, which provides a user interface. The navigation control unit 40 controls the whole navigation system.

The map data management unit 50 manages three-dimensional topography data and two-dimensional linear data stored in the three-dimensional topography database 60 and the two-dimensional database 70, respectively, and transmits the three-dimensional topography data and the two-dimensional linear data to the two-dimensional-data three-dimensional transformation unit 80.

The two-dimensional-data three-dimensional transformation unit 80 three-dimensionally transforms the two-dimensional linear data in accordance with the three-dimensional topography data in real time. The map data output unit 90 outputs the transformed data together with the three-dimensional topography data to the navigation display unit 100.

Figure 3:
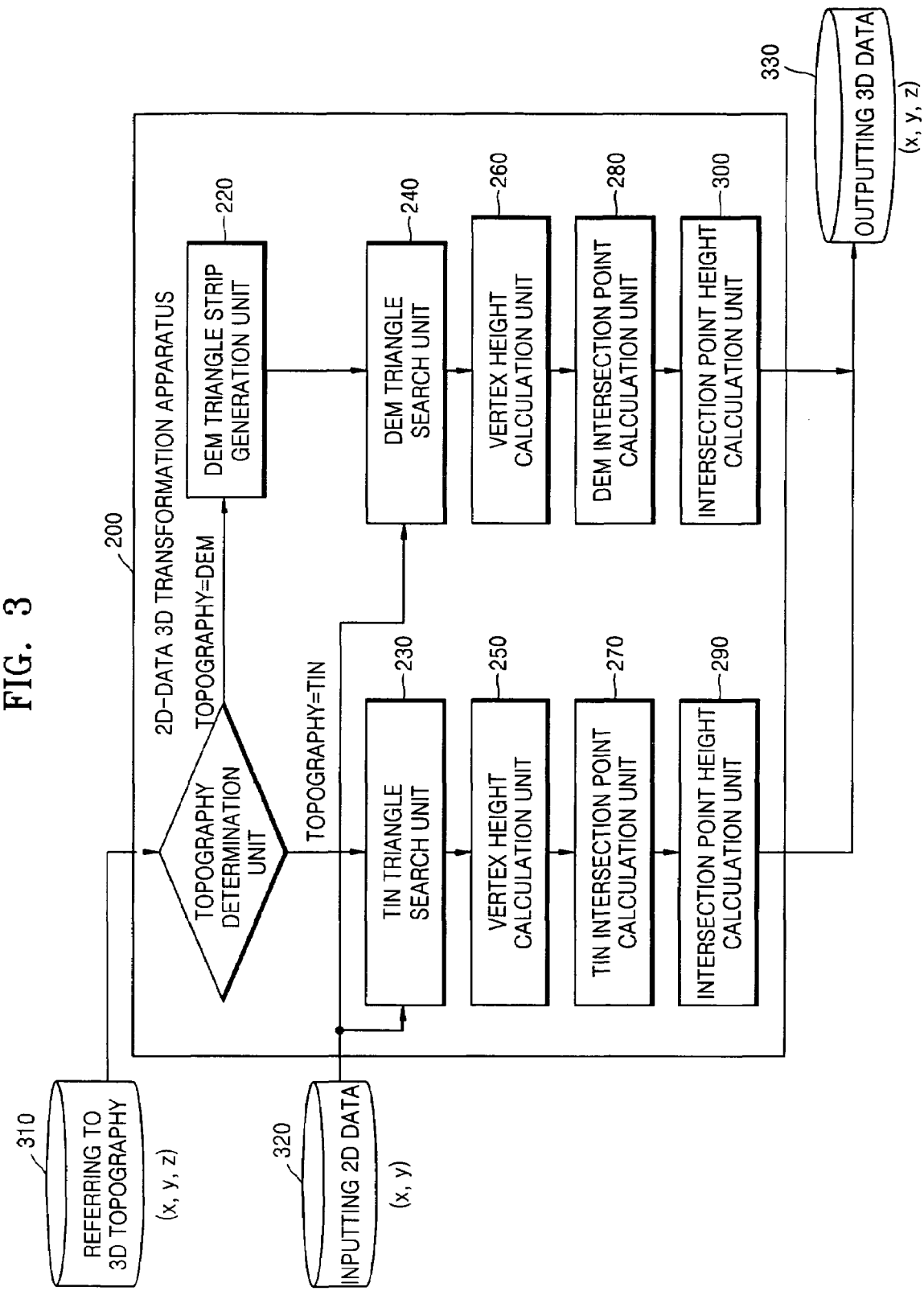
FIG. 3 is a block diagram showing an apparatus (three-dimensional transformation apparatus) for three-dimensionally transforming two-dimensional linear data in accordance with three-dimensional topography data in real time according to an embodiment of the present invention.

FIG. 3 is a block diagram showing an apparatus (hereinafter referred to a real-time two-dimensional-data three-dimensional transformation apparatus) for three-dimensionally transforming two-dimensional linear data in accordance with three-dimensional topography data in real time according to an embodiment of the present invention.

The real-time two-dimensional-data three-dimensional transformation apparatus 200 according to the present embodiment includes a topography determination unit 210, a triangle strip generation unit 220, triangle search units 230 and 240, vertex height calculation units 250 and 260, intersection point calculation units 270 and 280, and intersection point height calculation units 290 and 300. The triangle search units 230 and 240, the vertex height calculation units 250 and 260, the intersection point calculation units 270 and 280, and the intersection point height calculation units 290 and 300 may have different constructions according to the expression formats of the three-dimensional topography data. FIG. 3 separately shows the components 230, 250, 270, and 290 corresponding to a triangulated irregular network (TIN) format and the components 240, 260, 280, and 300 corresponding to the digital elevation model (DEM) format.

The topography determination unit 210 determines the expression format of the three-dimensional topography data. As described above, the DEM and TIN formats are mainly used as the expression format of the three-dimensional topography data.

Figure 4A:
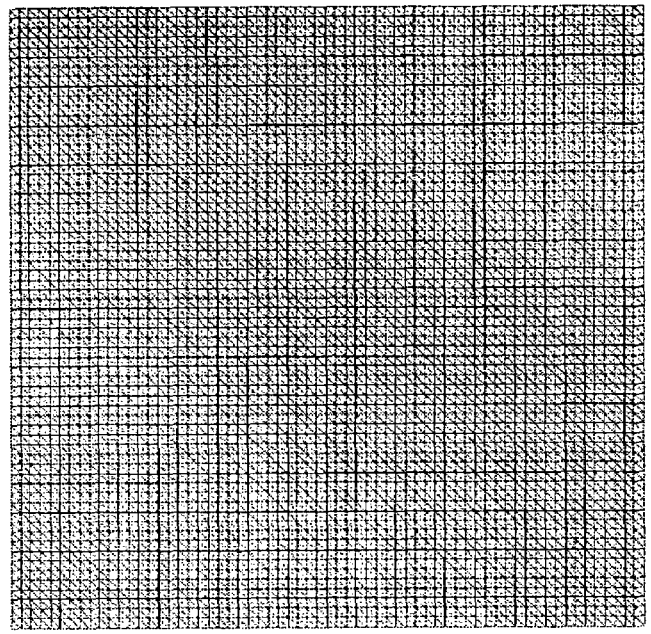
FIGS. 4A and 4B are views showing a digital elevation model (DEM) format and a triangulated irregular network (TIN) format, respectively.
Figure 4B:
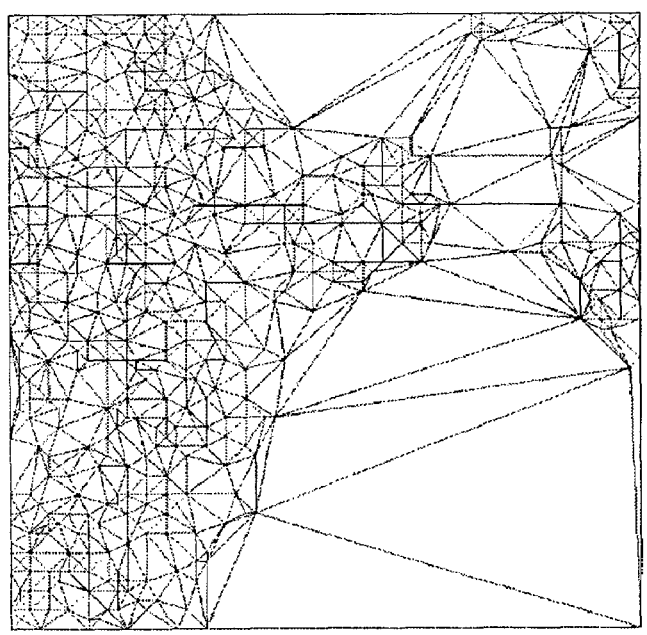

FIGS. 4A and 4B are views showing the DEM and TIN formats, respectively.

Referring to FIG. 4A, in the DEM format, right triangles with a constant height and base are repeatedly arrayed. Information such as positions and altitudes of the vertexes is stored in the angular points of the triangles.

Referring to FIG. 4B, in the TIN format, three points having similar altitudes constitutes a triangle. Since the connected three points have similar altitudes, the triangle is irregular.

Since the DEM and TIN formats have different shapes of the triangles constituting the respective three-dimensional topography data, there is a difference between two-dimensional linear data three-dimensional transformation schemes corresponding to the shapes of the triangles.

Now, common details of the two-dimensional linear data three-dimensional transformation schemes and specific details thereof associated with the respective expression formats will be described.

Referring to FIG. 3, firstly, the topography determination unit 210 determines the expression formats of the three-dimensional topography data.

If the format of the three-dimensional topography data is determined to be the DEM format by the topography determination unit 210, the triangle strip generation unit 220 transforms the triangles constituting the three-dimensional topography data into triangle strips.

The triangle strip for a set of triangles is a strip obtained by connecting vertexes (a representative point of a triangle) to express coordinates of triangles in the set of the triangles, wherein a newly added triangle (a newly added vertex) is obtained by adding one angular point. The triangle strip will be described in detail with reference to FIGS. 5 and 6.

Figure 5:
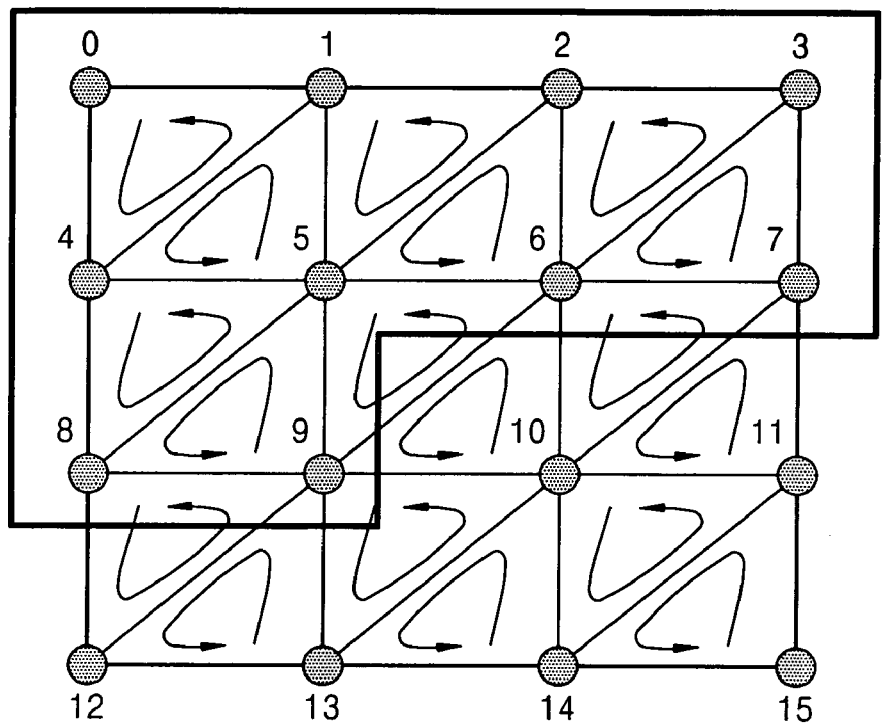
FIG. 5 is a view showing a general triangle coordinate expression format.

FIG. 5 is a view showing a general triangle coordinate expression format. A triangle can be expressed with an ordered arrangement of three angular points of the triangle. In the example shown in FIG. 5, the first triangle can be expressed with the angular point sequence (0, 4, 1), and the second triangle can be expressed with the angular point sequence (1, 4, 5). A facing direction (front or rear facing direction) of a triangle can be calculated form the arrangement order of angular points in an angular point sequence. If the angular points are arranged counterclockwise, the triangle has the front facing direction, so that a user sees the front surface of the triangle. In the example shown in FIG. 5, the angular points of all the triangles are arranged counterclockwise, all the triangles have the front facing direction.

The triangle expression scheme of FIG. 5 can be represented by using Algorithm 1 in a rendering language.

[Algorithm 1]

RenderingType(TRIANGLE)
    Vertex3D(p0); Vertex3D(p4); Vertex3D(p1);
    Vertex3D(p1); Vertex3D(p4); Vertex3D(p5);
    Vertex3D(p1); Vertex3D(p5); Vertex3D(p2);
    Vertex3D(p2); Vertex3D(p5); Vertex3D(p6);
    Vertex3D(p2); Vertex3D(p6); Vertex3D(p3);
    End(TRIANGLE)

Referring to Algorithm 1, it can be seen that there is redundancy in information on the same angular points. Redundant triangle information is directly transmitted to hardware such as a graphic accelerator. Therefore, redundant triangles are depicted by the redundant triangle information. As a result, there is a problem in that a hardware speed such as a calculation speed decreases.

Figure 6:
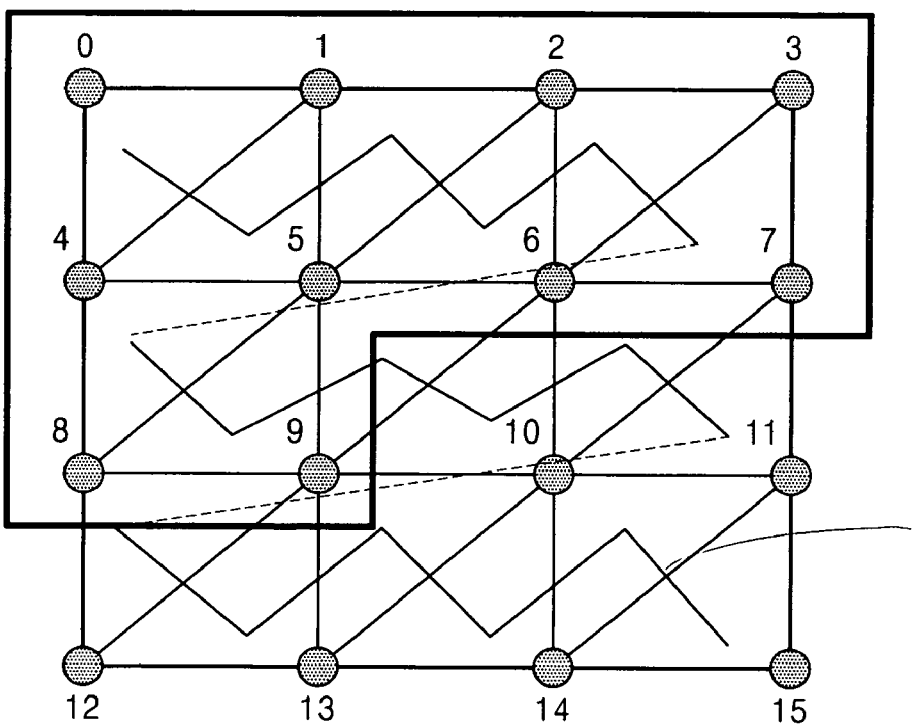
FIG. 6 is a view showing a set of triangles expressed with triangle strips.

In order to transmit the only one out of the redundant triangle information, the aforementioned triangle strip expression scheme has been proposed. FIG. 6 is a view showing a set of triangles expressed with the triangle strips.

Referring to FIG. 6, in the triangle strip expression scheme, a newly added triangle (a newly added vertex) is obtained by adding one angular point as described above. For example, a first triangle is constructed by arranging angular points 0, 4, and 1, and then, another angular point 5 is added to construct a second triangle with the angular points 4, 1, and 5.

The triangle strip expression scheme can be represented by using Algorithm 2 in a rendering language.

[Algorithm 2]

RenderingType(TRIANGLE_STRIP)
    Vertex3D(p0); Vertex3D(p4); Vertex3D(p1);
    Vertex3D(p5); Vertex3D(p2); Vertex3D(p6);
    Vertex3D(p3); Vertex3D(p7); Vertex3D(p7);
    Vertex3D(p4); Vertex3D(p4); Vertex3D(p8);
    Vertex3D(p5); Vertex3D(p9); Vertex3D(p6);
    . . . . . .

End(TRIANGLE_STRIP)

Referring to Algorithm 2, it can be seen that there is no redundancy in information on the same angular points because the newly added triangle is obtained by adding one angular point. Therefore, the number of transmitted information of the angular points can decrease, and all the triangle strips can be rendered at one time by hardware, so that the rendering speed can greatly increase.

In the triangle strip expression scheme, there is difficulty in connecting the last triangle of an upper row with the first triangle of the lower row. For example, when the angular point p4 is added to the angular points 3, 6 and 7 disposed at the upper low, a triangle is depicted with the angular points 6, 7, and 4. However, the angular points 6, 7, and 4 must not constitute a triangle as shown in FIG. 6. In order to avoid the problem, in the triangle strip expression scheme, the points 7 and 4 are listed twice in the algorithm 2 and no triangle is depicted with a sequence of angular points including twice listed angular points. The twice-listed angular points lead to slight increase in data amount. However, since there are a large number of triangles in one row, the slight increase in data amount due to the twice-listed angular points is negligible.

After the triangle strip generation unit 220 generates the triangle strip representing the coordinates of the triangles constituting the three-dimensional topography data, the two-dimensional linear data is transformed in accordance with the three-dimensional topography data.

Figure 7A:
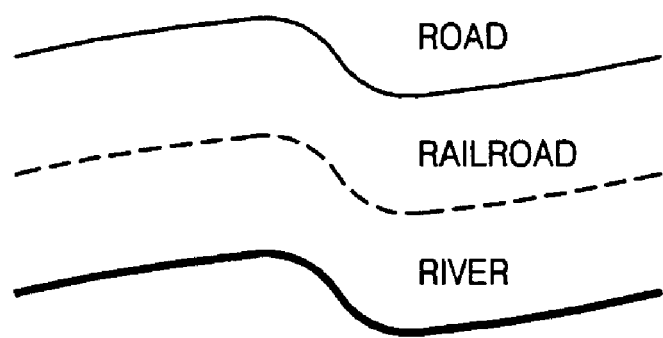
FIGS. 7A and 7B are views showing examples of two-dimensional linear data used for two-dimensional linear data three-dimensional transformation and visualization systems according to an embodiment of the present invention.
Figure 7B:
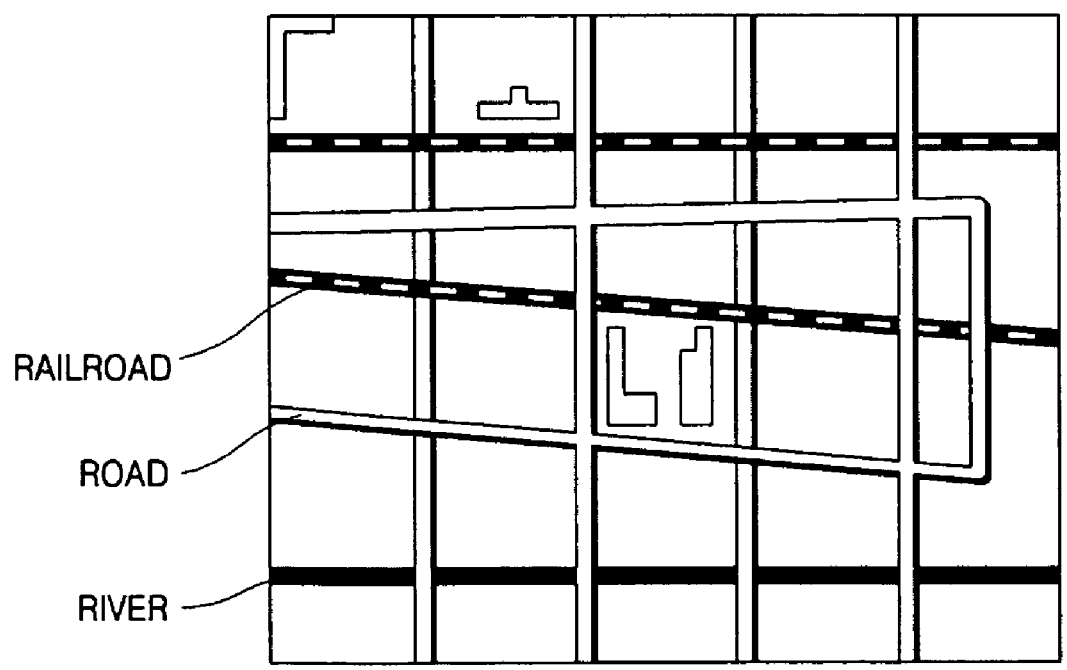

According to an embodiment of the present invention, two-dimensional linear data among the two-dimensional linear data is transformed and visualized. FIGS. 7A and 7B are views showing examples of the two-dimensional linear data used for the two-dimensional linear data three-dimensional transformation and visualization systems according to an embodiment of the present invention. The two-dimensional linear data used for the two-dimensional linear data three-dimensional transformation and visualization systems is data on map objects such as roads, railroads, or rivers.

Referring to FIG. 7A, the road, railroad, and river are represented with fine solid, doted, and bold solid lines, respectively. The map objects can be identified with colors as well as types and thickness of lines.

Referring to FIG. 7B, the two-dimensional linear data is visualized in a two-dimensional format. When the two-dimensional linear data is visualized in such as two-dimensional format, information on the map cannot be intuitively perceived.

Figure 8:
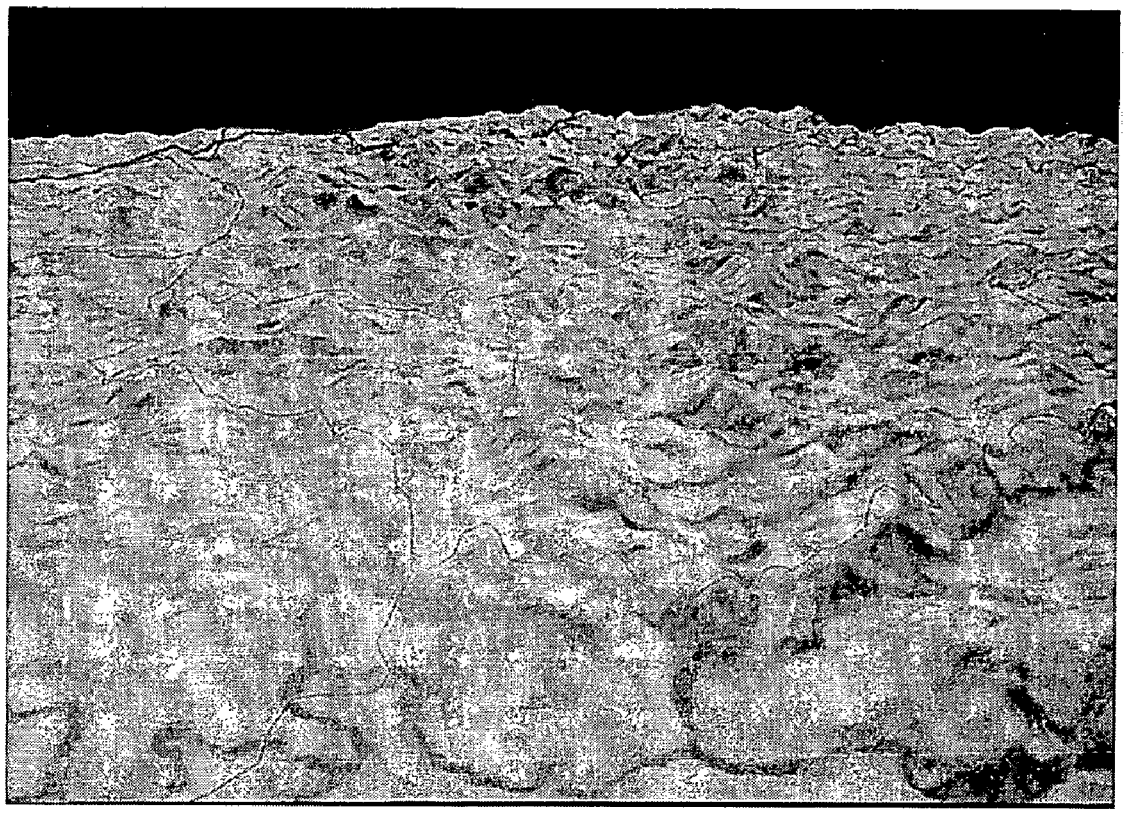
FIG. 8 is a view showing an example of three-dimensionally transforming two-dimensional linear data in accordance with three-dimensional topography data and three-dimensionally visualizing the two-dimensional linear data together with the three-dimensional topography data.

On the other hand, FIG. 8 is a view showing an example of three-dimensionally transforming two-dimensional linear data in accordance with three-dimensional topography data and three-dimensionally visualizing the two-dimensional linear data together with the three-dimensional topography data The two-dimensional linear data which is transformed into three-dimensional data is depicted in, for example, blue and red together with three-dimensional topography data. The blue and red lines denote rivers and roads, respectively. By three-dimensionally visualizing the two-dimensional linear data together with the three-dimensional topography data, information on the map can be intuitively be perceived. The information on the map can be conveniently and safely provided to the user.

When the two-dimensional linear data is transformed into the three-dimensional topography data, height values, that is, z coordinates are added to the two-dimensional coordinates in the three-dimensional topography data. Since the three-dimensional topography data includes information on vertexes and relations thereof, the heights of the vertexes have to be calculated.

Referring to FIG. 2, before the heights of the vertexes are calculated, the triangle search units 230 and 240 search triangles in which vertexes constituting the two-dimensional linear data are contained among triangles constituting the three-dimensional topography data. In case of the DEM format, since the x and y coordinates of the triangles are arranged regularly, the triangles in which the vertexes are contained can be easily searched.

However, in case of the TIN format, the triangles in which the vertexes are contained cannot be easily searched. In this case, it is inconvenient to directly handle the triangles, so that boundary rectangles (BR) are introduced.

Figure 9:
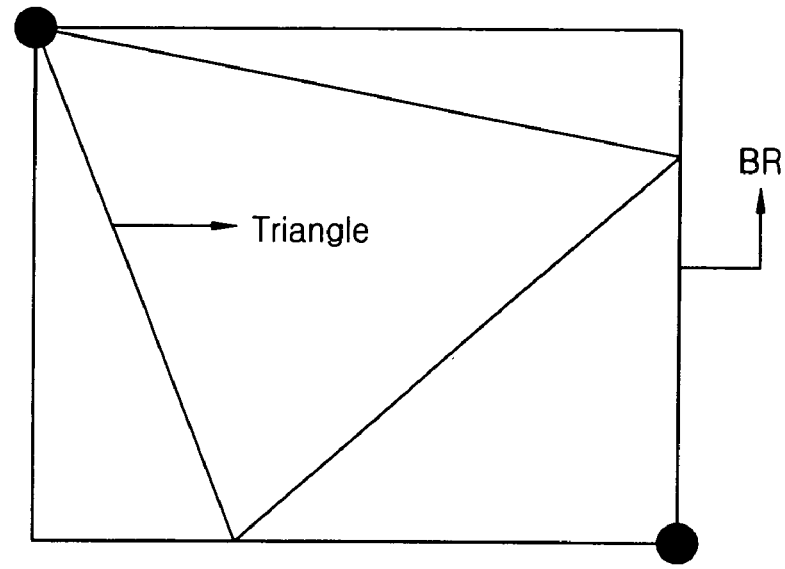
FIG. 9 is a view showing a triangle and a boundary rectangle in which the triangle is inscribed.

The boundary rectangle denotes a rectangle in which a triangle is inscribed. FIG. 9 is a view showing a triangle and a boundary rectangle in which the triangle is inscribed.

As shown in FIG. 9, a boundary rectangle can be represented with an upper left corner coordinate (x1, y1) and a lower right corner coordinate (x2, y2). All the vertexes of which x and y coordinates are in a range of x1 to x2 and in a range of y1 to y2, respectively, are contained in the boundary rectangle.

In case of the TIN format, boundary rectangles in which respective triangles constituting three-dimensional topography data are inscribed are calculated. Each of the boundary rectangles can be easily obtained by defining smallest and largest values in x coordinates of the three angular points of the respective triangle as x1 and x2 of the boundary rectangle and defining smallest and largest values in y coordinates of the three angular points of the respective triangle as y1 and y2 of the boundary rectangle.

Next, at least one boundary rectangles containing the vertexes, of which heights are to be calculated, are searched among the calculated boundary rectangles.

This calculation is performed by comparing the coordinates of the vertexes with the upper left and right corner coordinates of the boundary rectangle. However, if the vertexes are compared with all the boundary rectangles, a large calculation amount is needed. Therefore, the calculation amount is preferably reduced by using arrangement and binary search operations.

Firstly, the arrangement operation will be described. The boundary rectangles are arranged in an order of sizes of the x coordinates. More specifically, a first set of boundary rectangles is generated by arranging the searched boundary rectangles in an order of sizes of the x coordinates of the upper left corners of the boundary rectangles; and a second set of boundary rectangles is generated by arranging the searched boundary rectangles in an order of sizes of the x coordinates of the lower right corners of the boundary rectangles. The first and second sets of boundary rectangles are referred to as BR1 and BR2.

In a case where the boundary rectangles are arranged in an order of sizes of the x coordinates thereof, calculation complexity is O(NlogN), where N is the total number of boundary rectangles. Once the boundary rectangles are arranged in an order of sizes of the x coordinates thereof, the arranged boundary rectangles can be used for all the vertexes. Therefore, this arrangement operation is more efficient than the operation of directly comparing all the vertexes with all the boundary rectangles.

By using this arrangement operation, all the boundary rectangles corresponding to the vertexes, of which x coordinates are between the upper left and lower right x coordinates of the boundary rectangles, are searched among the boundary rectangles arranged in an order of sizes of the x coordinates.

Next, the search operation can be efficiently performed by using the binary search operation. The binary search operation results in calculation complexity of O(logN). Firstly, in the first set BR1 of boundary rectangles arranged in an order of sizes of the x coordinates of the upper left corners of the boundary rectangles, the boundary rectangle having the largest one in the upper left corner x coordinates smaller than the x coordinate of the corresponding vertex, of which height is to be obtained, is obtained by using the binary search operation. The boundary rectangles, of which upper left corner x coordinates are smaller than that of the obtained boundary rectangle, have the upper left corner x coordinates smaller than that of the vertex. A set of these boundary rectangles is referred to S1.

Next, in the second set BR2 of boundary rectangles arranged in an order of sizes of the x coordinates of the lower right corners of the boundary rectangles, the boundary rectangle having the smallest one in the lower right corner x coordinates larger than the x coordinate of the corresponding vertex, of which height is to be obtained, is obtained by using the binary search operation. The boundary rectangles, of which lower right corner x coordinates are larger than that of the obtained boundary rectangle, have the lower right corner x coordinates larger than that of the vertex. A set of these boundary rectangles is referred to S2.

If an x coordinate of the vertex, of which height is to be obtained, is between the upper right corner x coordinate and the lower left corner x coordinate of a boundary rectangle, the boundary rectangle commonly belongs to the sets S1 and S2.

Next, the same operation is performed on the y coordinates. Firstly, the arrangement operation will be described. The boundary rectangles are arranged in an order of sizes of the y coordinates. Similar to the x coordinates, a first set of boundary rectangles is generated by arranging the searched boundary rectangles in an order of sizes of the y coordinates of the lower right corners of the boundary rectangles; and a second set of boundary rectangles is generated by arranging the searched boundary rectangles in an order of sizes of the y coordinates of the upper left corners of the boundary rectangles. The first and second sets of boundary rectangles are referred to as BR3 and BR4.

By applying the binary search operation on the set BR3, all the boundary rectangles corresponding to the vertexes, of which lower right y coordinates are smaller than the y coordinate of the vertex of which height is to be calculated, are searched. The set of these searched boundary rectangles are referred to as S3. In addition, by applying the binary search operation on the set BR4, all the boundary rectangles corresponding to the vertexes, of which upper right y coordinates are larger than the y coordinate of the vertex of which height is to be calculated, are searched. The set of these searched boundary rectangles are referred to as S4.

If a y coordinate of the vertex, of which height is to be obtained, is between the upper right corner y coordinate and the lower left corner y coordinate of a boundary rectangle, the boundary rectangle commonly belongs to the sets S3 and S4.

In some embodiments, data structure is suitably constructed to gradually reduce the number of boundary rectangles contained in each of the operations. For example, when the sets BR1 and BR2 are constructed, the same boundary rectangles may be linked. After the set S1 is constructed, boundary rectangles which are not included in the set S1 are excluded from the set BR2. If the number of boundary rectangles included in the set S1 is p, the calculation complexity for the operation of generating the set S2 from the set BR2 is not O(logN) but O(log p), so that the calculation amount can be reduced.

In addition, the order of calculations for the x and y coordinates may be exchanged. In addition, the calculations for the x and y coordinates may be performed simultaneously.

When the boundary rectangle search operations for the x and y coordinates are completed, all the obtained boundary rectangles include vertexes of which heights are to be calculated. Since the needed ones are triangles including the vertexes of which heights are to be calculated, it is determined whether or not triangles corresponding to the searched boundary rectangle include the vertexes.

If the number of the searched boundary rectangles is 1, the corresponding triangle necessarily has the vertex of which height is to be calculated. As a result, it is determined that the triangle corresponding to the searched boundary rectangle includes the vertex. However, if the number of the searched boundary rectangles is two or more, an operation of determining whether or not triangles corresponding to the searched boundary rectangle include the vertexes is performed.

The operation of determining whether or not triangles include the vertexes is performed by using a vector product.

The vector products are defined by Equations 1. Here, p1, p1, and p3 denote angular points of the triangle, and v denotes a vertex, of which height is to be obtained.

$$c_1 = \overrightarrow{p_0 p_1} \times \overrightarrow{p_0 v}$$

$$c_2 = \overrightarrow{p_1 p_2} \times \overrightarrow{p_1 v}$$

$$c_3 = \overrightarrow{p_2 p_0} \times \overrightarrow{p_2 v}$$ [Equations 1]

If the vertex v is located at the left side of one of the vectors $\overrightarrow{p_0 p_1}$, $\overrightarrow{p_1 p_2}$, and $\overrightarrow{p_2 p_0}$ of sides of the triangle, the vector product has a positive value. If the vertex v is located at the right side of one of the vectors, the vector product has a negative value. If all the three vector products have positive values, the vertex v exists inside the triangle. If not, the vertex v exists outside the triangle. In addition, the location of the vertex can be simply determined by using a product of the three values of the vector products. If the product of the three values of the vector products is positive, all the three vector products have positive values, so that the vertex v can be determined to exist inside the triangle. If the product of the three values is negative, the vertex v exists outside the triangle.

Returning to FIG. 2, after the triangle search units 230 and 240 search the triangles in which the vertexes constituting the two-dimensional linear data are contained, the vertex height calculation units 250 and 260 calculate the heights of the vertexes by using the three-dimensional data of the searched triangles.

In the calculation operation for the heights of the vertexes, a plane equation for a plane containing the searched triangles is obtained, and then, the plane equation is solved with respect to a z-coordinate variable by substituting two-dimensional coordinates in the plane equation.

Figure 10:
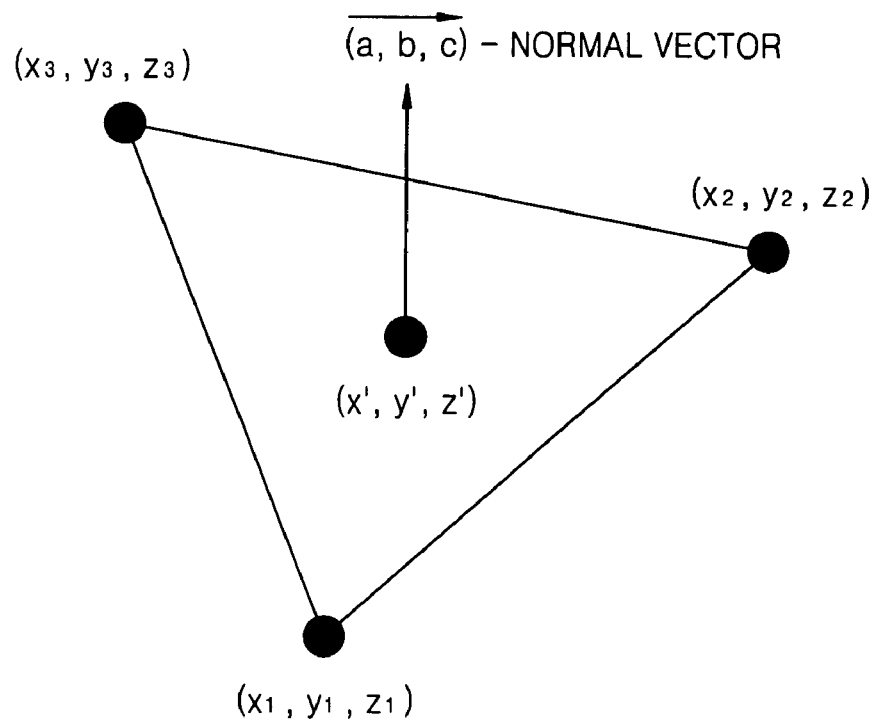
FIG. 10 is a view showing a relationship between a three-dimensional plane and a normal vector thereto.

The plane equation is represented as ax+by+cz+d=0. Here, coefficients a, b, and c are components of a normal vector of the plane. The normal vector is obtained by the following operation. A relation between the plane and the normal vector is shown in FIG. 10.

Firstly, one of the three angular points of a triangle is selected. Next, two vectors from the selected angular points to the remaining two ones are obtained. Next, the vector product of the two vectors is calculated. The resulting vector obtained by the vector product is the aforementioned normal vector.

By substituting the components a, b, and c of the normal vector and the coordinates x, y, and z of one angular point in the plane equation, the value of d is obtained. As a result, a, b, c, and d of the plane equation are completely determined.

Next, in order to the height of the vertex v, the x and y coordinates of the vertex v is substituted in the plane equation, and the plane equation is solved with respect to the variable z. The value of the variable z is the aforementioned height of the vertex v.

Figure 11:
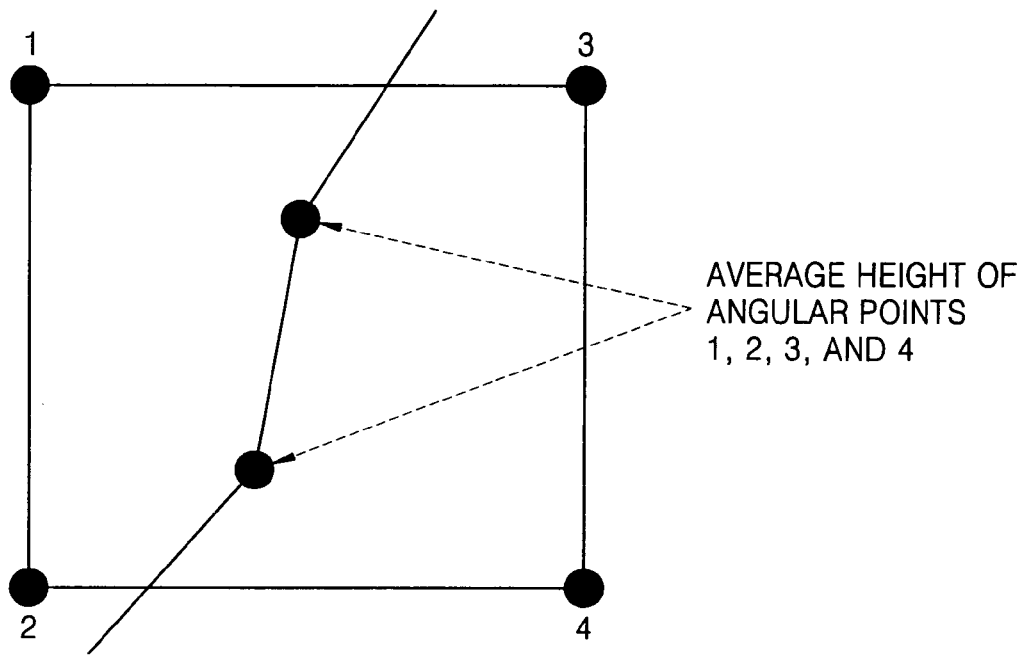
FIG. 11 is a view showing an example of an operation of obtaining a height of a vertex by using an average height of a cell including the vertex.
Figure 12:
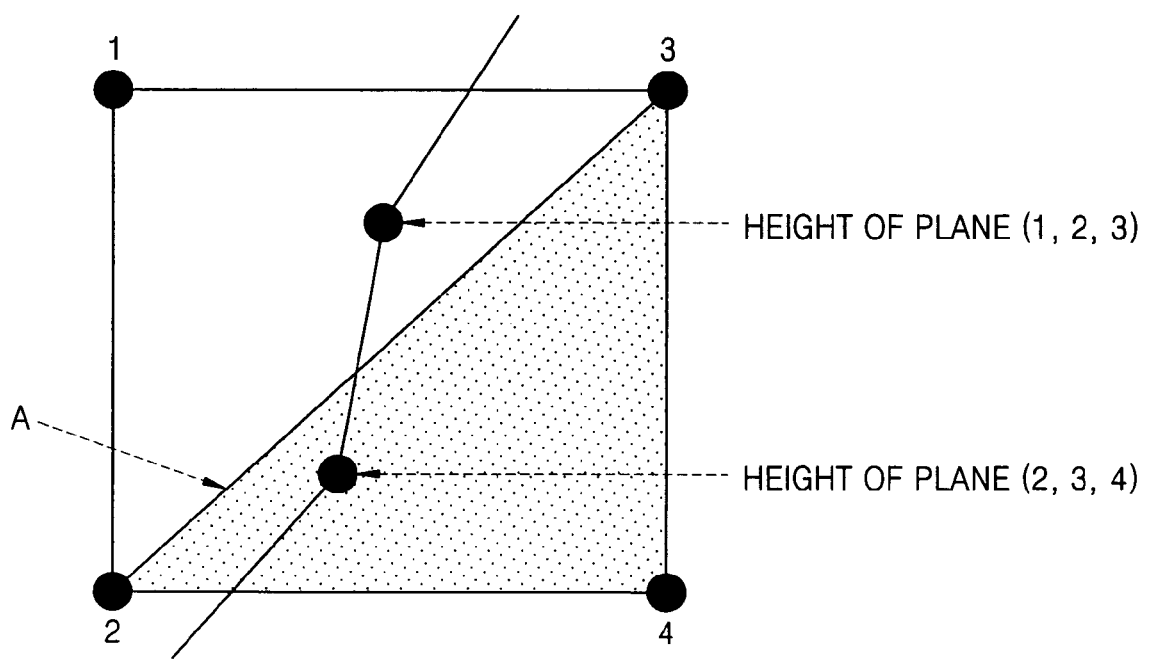
FIG. 12 is a view showing an example of an operation of obtaining a height of a vertex by using an average height of a triangle including the vertex or a height of a plane including the vertex.

In a case where the three-dimensional topography data is expressed in a DEM format, simpler height calculation methods may be used to reduce the calculation amount. FIGS. 11 and 12 show examples of the simpler height calculation methods.

FIG. 11 is a view showing an example of an operation of obtaining a height of a vertex included in each of the triangles of the three-dimensional topography data expressed in the DEM format by using an average height of a cell including the vertex. The average height of the cell denotes an average of heights of the angular points 1, 2, 3, and 4 of the cell. Therefore, the two vertexes included in the cell have the same height.

FIG. 12 is a view showing an example of an operation of obtaining a height of a vertex included in each of the triangles of the three-dimensional topography data expressed in the DEM format by using an average height of a triangle including the vertex or a height of a plane including the vertex. The cell is divided into two triangles by a segment A directing from an upper right corner to a lower left corner. A height of an upper vertex is an average height of a plane of an upper triangle (1, 2, 3). A height of a lower vertex is an average height of a plane of a lower triangle (2, 3, 4).

After all the heights of the vertexes constituting the two-dimensional linear data are obtained, it is necessary to obtain intersection points between the straight lines constituting the two-dimensional linear data and the triangles in the three-dimensional topography data. The reason for obtaining the intersection points is as follows.

A plane equation changes at the boundary of each of the triangles. A straight line in the two-dimensional linear data is angled at the boundary of each of the triangles in the three-dimensional topography data. In order to visualize the two-dimensional linear data with reality, it is necessary to obtain the intersection points of the triangles and the straight lines and calculate heights of the intersection points.

In the intersection calculation units 270 and 280, the intersection points between the straight lines constituting the two-dimensional linear data and the triangles constituting the three-dimensional topography data are obtained as follows.

In a case where the three-dimensional topography data is expressed in a DEM format, since the triangles constituting the three-dimensional topography data are arrayed regularly, the boundary lines are also arrayed regularly.

Figure 13:
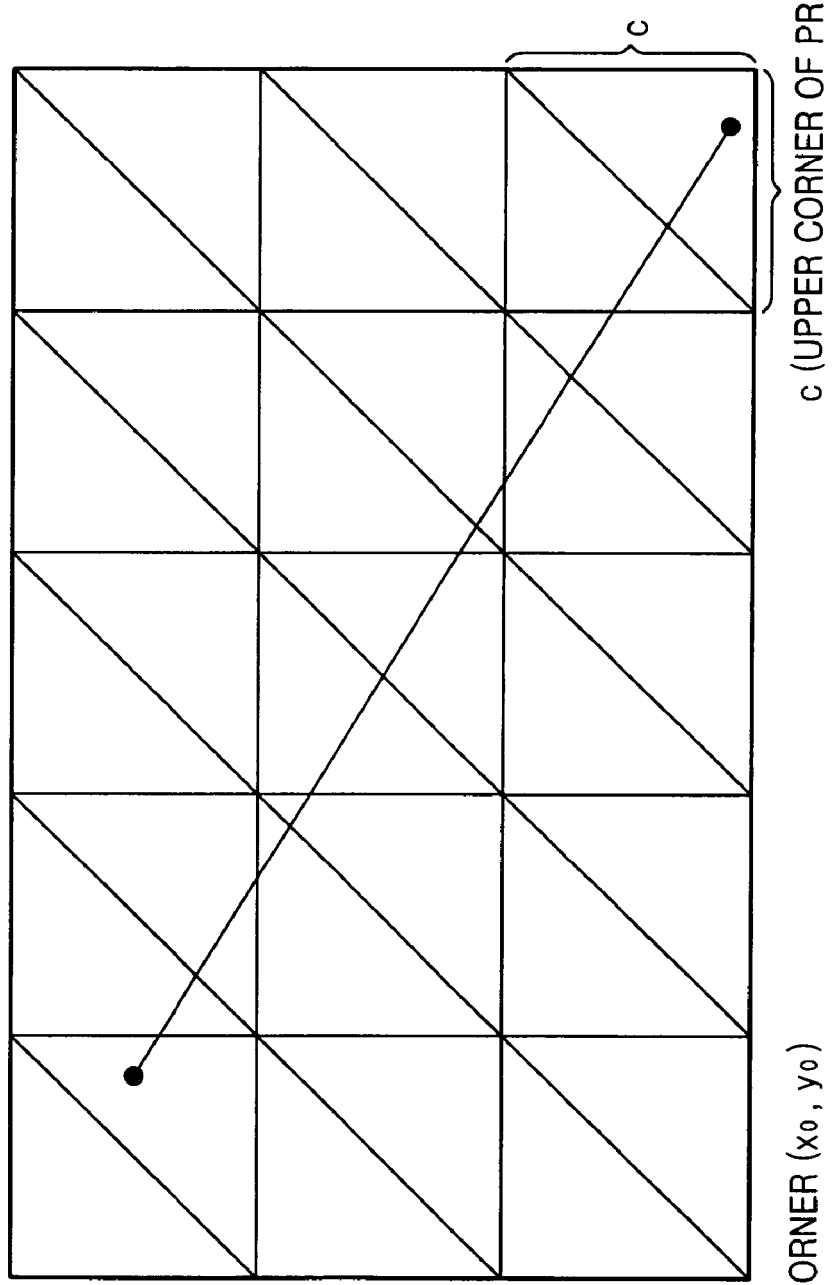
FIG. 13 is a view showing an example of an operation of obtaining intersection points between triangles of a straight line in a case where the three-dimensional topography data is expressed in a DEM format.

FIG. 13 is a view showing an example of an operation of obtaining intersection points between triangles of a straight line in a case where the three-dimensional topography data is expressed in a DEM format. The reference point is the lower left corner of which coordinate is ($x_0$, $y_0$), and a width of each cell is c.

Figure 14A:
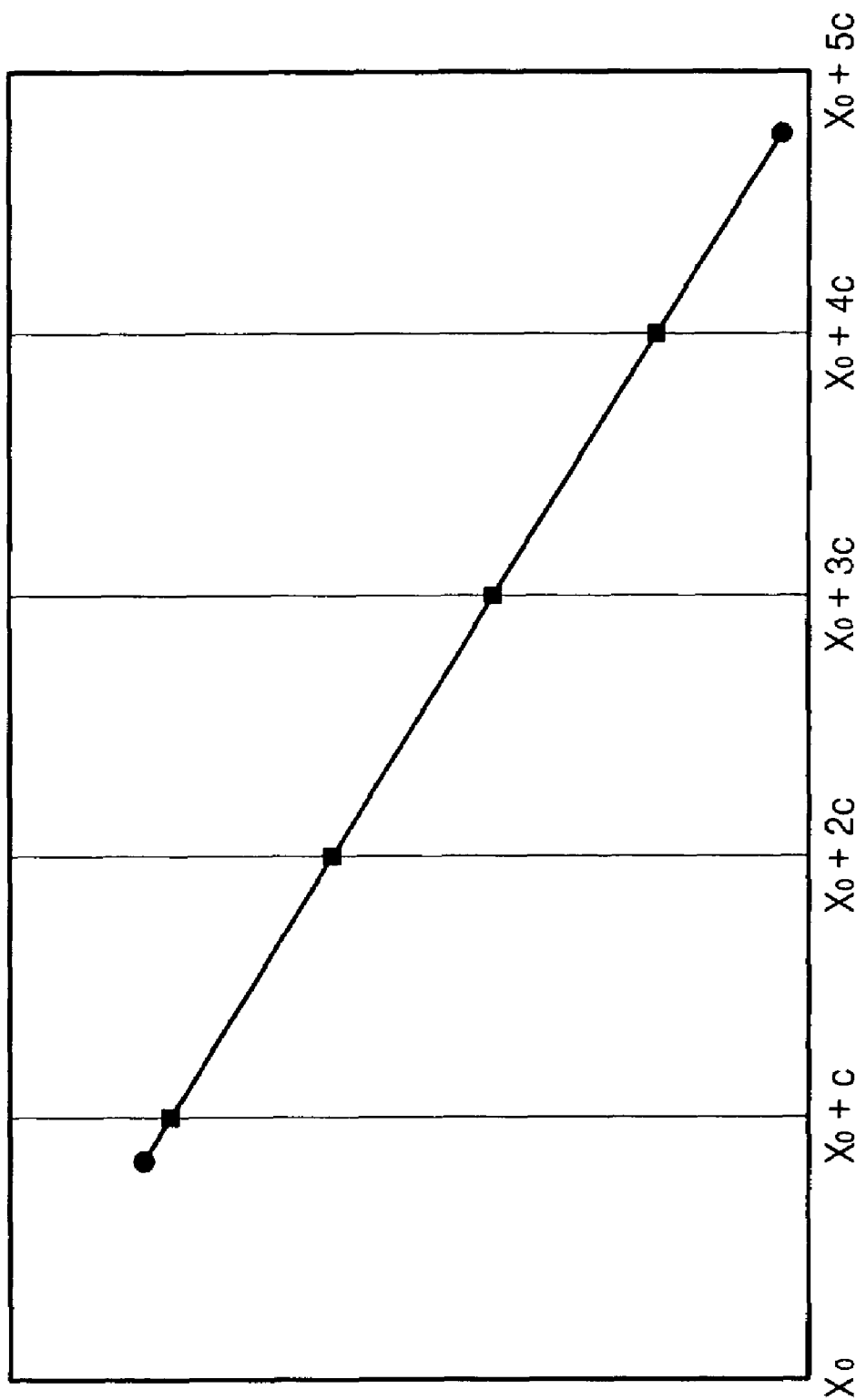
FIGS. 14A to 14C are views showing examples of an operation of obtaining intersection points between a straight line and boundary lines in column, low, and hypotenuse directions.
Figure 14B:
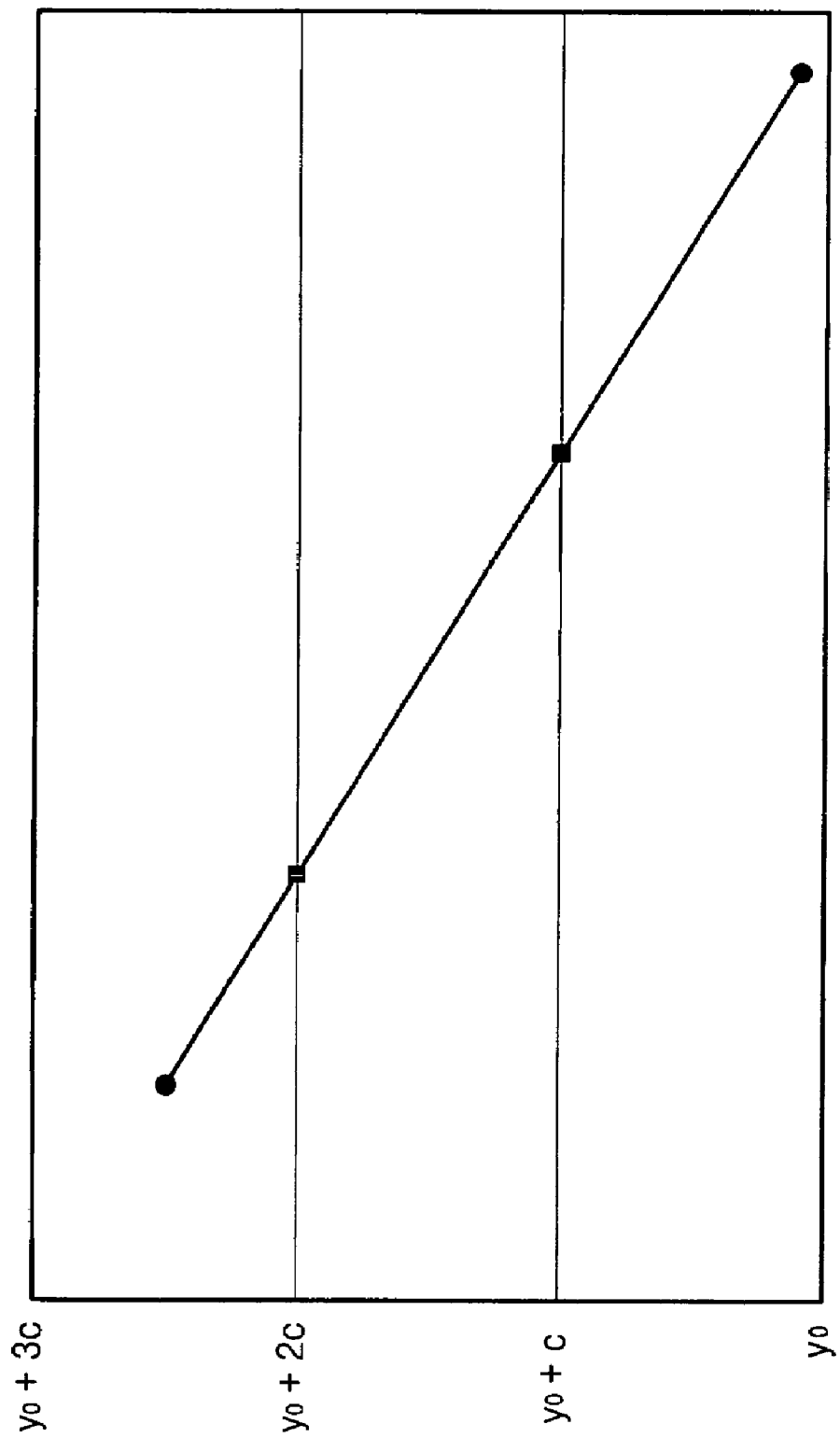
Figure 14C:
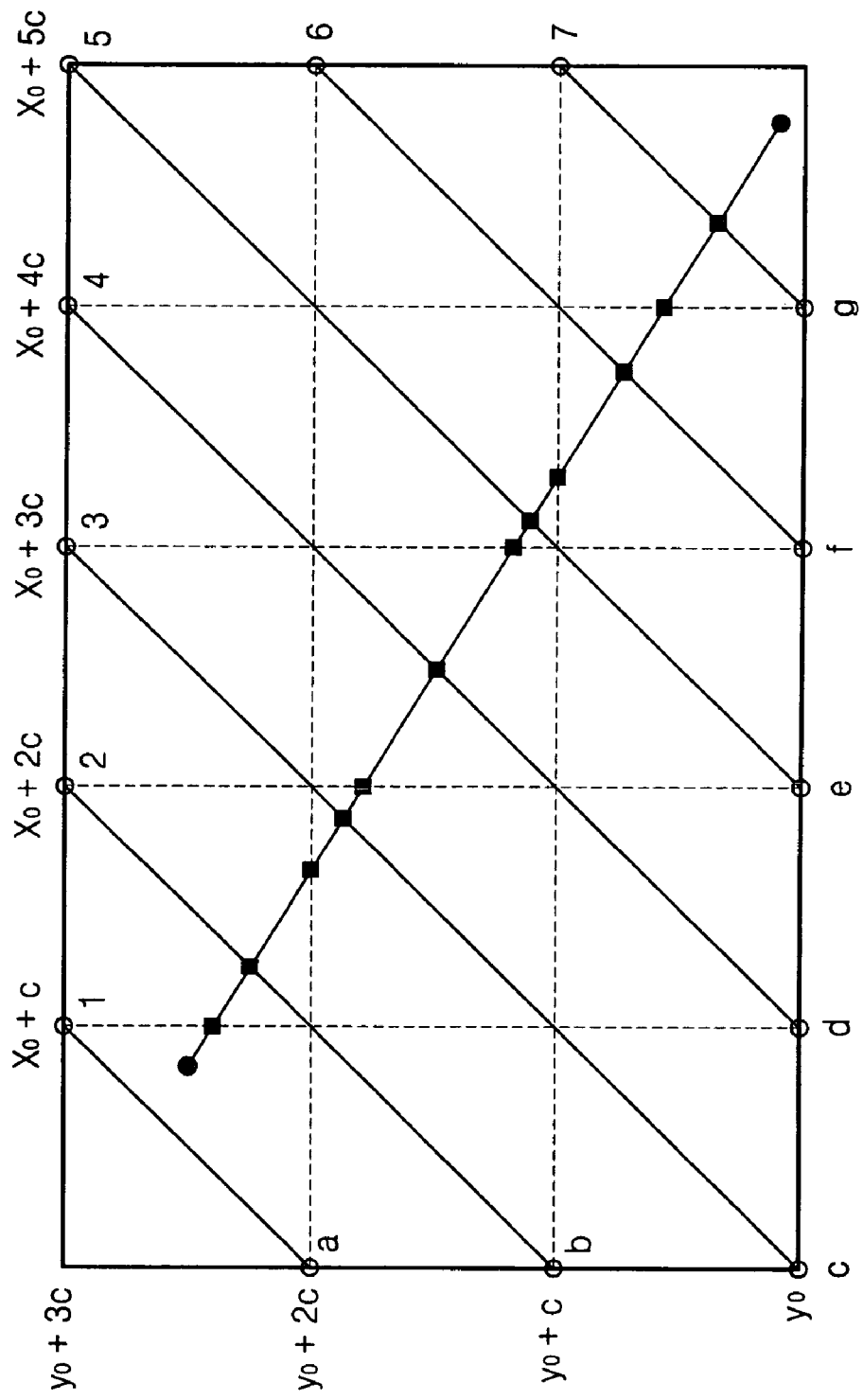

FIGS. 14A to 14C are views showing examples of an operation of obtaining intersection points between a straight line and boundary lines in column, low, and hypotenuse directions of the example shown in FIG. 13. The intersection points can be easily obtained by using x and y coordinates of the boundary lines and a linear equation of a straight line of hypotenuse.

FIG. 14A shows an example of an operation of obtaining the intersection points between the column-directional (y-directional) boundary lines and the straight line. The x coordinates of the boundary lines are $x_0+c$, $x_0+2c$, $x_0+3c$, $x_0+4c$, and $x_0+5c$, respectively. These x coordinates correspond to the x coordinates of end points on the bases of the triangles constituting the three-dimensional topography data. By substituting the x coordinate of each boundary line in a linear equation $ax+by+c=0$, the y coordinate thereof is obtained.

FIG. 14B shows an example of an operation of obtaining the intersection points between the row-directional (x-directional) boundary lines and the straight line. The y coordinates of the boundary lines are $y_0+c$ and $y_0+2c$, respectively. These y coordinates correspond to the y coordinates of end points on the bases of the triangles constituting the three-dimensional topography data. By substituting the y coordinate of each boundary line in the linear equation, the x coordinate thereof is obtained.

FIG. 14C shows an example of an operation of obtaining the intersection points between the diagonal boundary lines and the straight line. In the example, the straight line constituting the two-dimensional linear data intersects 6 straight lines: straight lines from points b, c, d, e, f, and g to the respective points 2, 3, 4, 5, 6, and 7. Although the operation of obtaining the intersection points between the 6 straight lines (hypotenuses) and the straight line constituting the two-dimensional linear data is more difficult than the operations of obtaining the intersections in FIGS. 14A and 14B, the intersection points can be obtained by solving a simultaneous equation of the linear equations of the straight lines (hypotenuses) and the linear equation of the straight line constituting the two-dimensional linear data.

FIG. 15 is a view showing intersection points between the straight line and the boundary lines arranged in an order of a distance from one end point of the straight line. If the number of intersection points is n, the calculation complexity is $O(n\log n)$. In a case where the three-dimensional topography data is expressed in a TIN format, since the triangles are irregular, the boundary rectangles need to be used.

Figure 16:
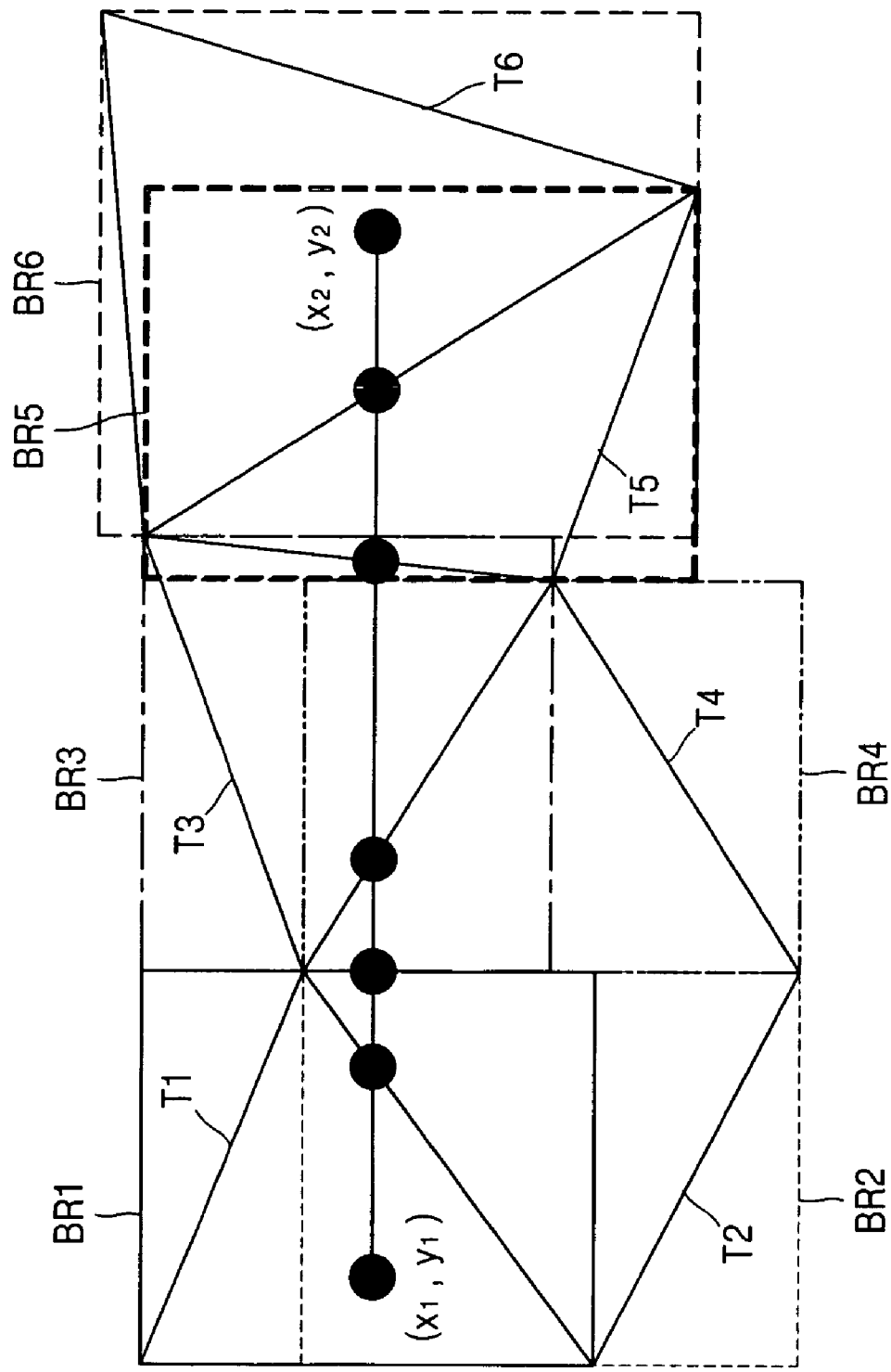
FIG. 16 is a view showing an example boundary rectangles corresponding to triangles constituting three-dimensional topography data in a case where the three-dimensional topography data is expressed in a TIN format.

FIG. 16 is a view showing an example of boundary rectangles used to obtain the intersection points between triangles constituting three-dimensional topography data and straight lines constituting the two-dimensional linear data in a case where the three-dimensional topography data is expressed in the TIN format. In the example, the straight line constituting the two-dimensional linear data intersects the boundary lines of the triangles T1 to T6.

Firstly, a boundary rectangle in which all the triangles constituting the three-dimensional topography data are inscribed is obtained. In this operation, a boundary rectangle previously obtained in the triangle search unit 230 of FIG. 2 may be used.

All the boundary rectangles partially or entirely including two-dimensional straight line are obtained among the boundary rectangles. Next, the intersection points between the two-dimensional straight line and the triangles corresponding to the obtained boundary rectangles are obtained.

Returning to FIG. 2, the intersection point calculation units 270 and 280 calculate all the intersection points between the straight lines constituting the two-dimensional linear data and the triangles constituting the three-dimensional topography data. Next, the intersection point height calculation units 290 and 300 calculate heights of the intersection points.

The operation of calculating the heights of the intersection point performed by the intersection point height calculation units 290 and 300 may be similar to the operation of calculating the heights of the vertexes performed by the vertex height calculation units 250 and 260. However, since the intersection points exist not within the triangles but at the boundary lines of the triangles, the triangles corresponding to the intersection points are obtained in advance, and then, the coordinates of the intersection points are calculated based on the coordinates of the triangles.

In a case where the three-dimensional topography data is expressed in the DEM format, the heights of the intersection points may be obtained by using an interpolation process.

Figure 17A:
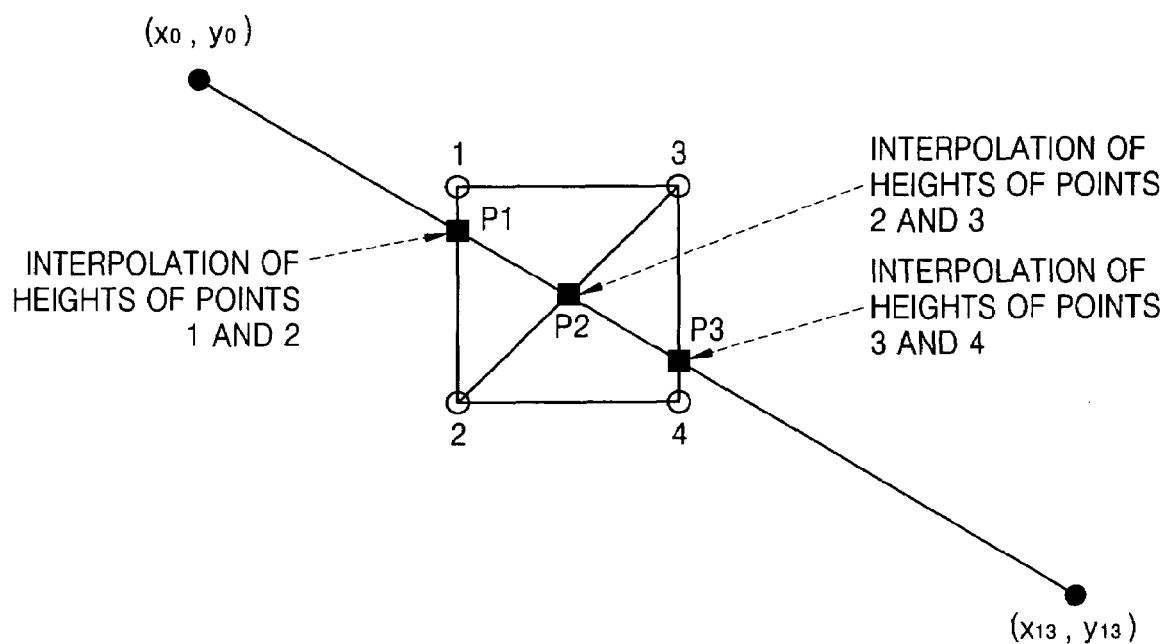
FIGS. 17A and 17B are views showing examples of an operation of obtaining heights of intersection points by using an interpolation process.
Figure 17B:
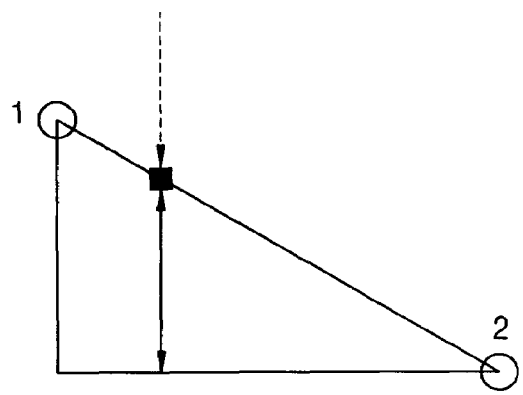

FIGS. 17A and 17B are views showing examples of an operation of obtaining the heights of intersection points by using the interpolation process.

Referring to FIG. 17A, a height of an intersection point p1 can be obtained by interpolating heights of the angular points 1 and 2 of an upper triangle; a height of an intersection point p2 can be obtained by interpolating heights of the angular points 2 and 3 of a lower triangle; and a height of an intersection point p3 can be obtained by interpolating heights of angular points 2 and 4.

Referring to FIG. 17B, the interpolation of the height of the intersection point p1 from the heights of the angular points 1 and 2 will be described in detail. Two distances between the intersection point p1 and the angular points 1 and 2 are indicated by d1 and d2. The heights of the angular points 1 and 2 are indicated by h1 and h2. The height of the intersection point p1 can be obtained by using Equation 2.

$$h = \frac{h_1 d_2 + h_2 d_1}{d_1 + d_2} \quad \text{[Equation 2]}$$

In a case where the three-dimensional topography data is expressed in the DEM format, if a vertex of the two-dimensional linear data exists outside the cell constituting the three-dimensional topography data, the height of the vertex can also be obtained by using the aforementioned interpolation process. This operation is exceptionally performed in a case where there is an error in a map provided by a map manufacturer.

Figure 18:
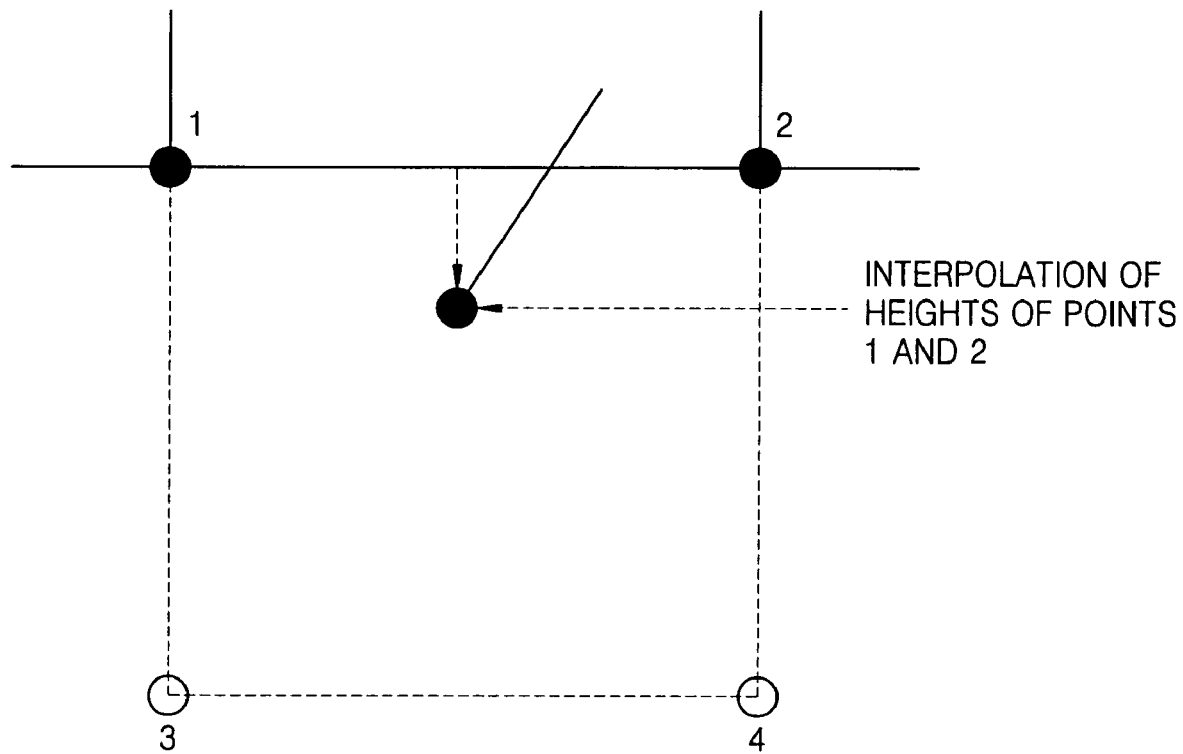
FIG. 18 is a view showing an example of an operation of obtaining a height of vertex existing outside the cell by interpolating heights of angular points of cells.

FIG. 18 is a view showing an example of an operation of obtaining the height of the vertex existing outside the cell by interpolating heights of angular points 1 and 2 of cells in the aforementioned case. As shown in FIG. 18, a virtual cell constructed with angular points 1, 2, 3, and 4 is assumed to include the actual vertex, that is, the vertex existing outside the actual cell. Since the virtual cell has no height information, the height of the actual vertex cannot be directly obtained. Therefore, it is assumed that a virtual vertex is located on a straight line directing from the angular point 1 to the angular point 2. Next, a height of the virtual vertex is obtained by using the interpolation process. The height of the virtual vertex is used as the height of the actual vertex.

Now, in the two-dimensional-data three-dimensional transformation unit 80 of FIG. 2, the two-dimensional linear data is transformed into three-dimensional data by using the calculated heights for the two-dimensional linear data. Next, the map data output unit 90 of FIG. 2 visualizes the three-dimensionally transformed two-dimensional linear data together with the three-dimensional topography data.

In a case where the three-dimensional topography data is expressed in the DEM format, the map data output unit 90 of FIG. 2 transmits all the coordinate values constituting the triangle strips generated by the triangle strip generation unit 220 of FIG. 3 to an output device at one time.

Figure 19A:
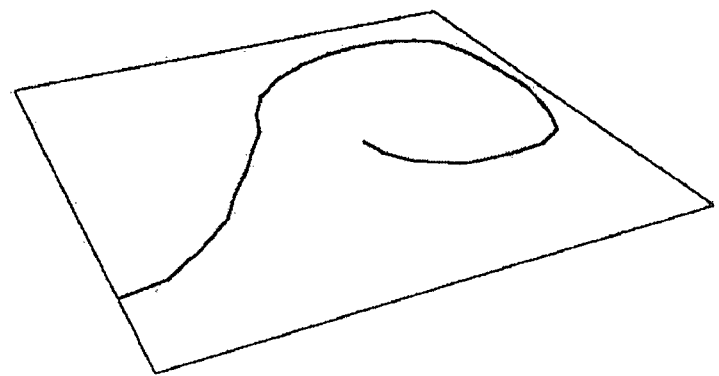
FIGS. 19A to 19C are views showing an example of three-dimensionally transforming two-dimensional linear data in accordance with three-dimensional topography data in real time and three-dimensionally visualizing the two-dimensional linear data together with the three-dimensional topography data in a case where the three-dimensional topography data is expressed in a DEM format.
Figure 19B:
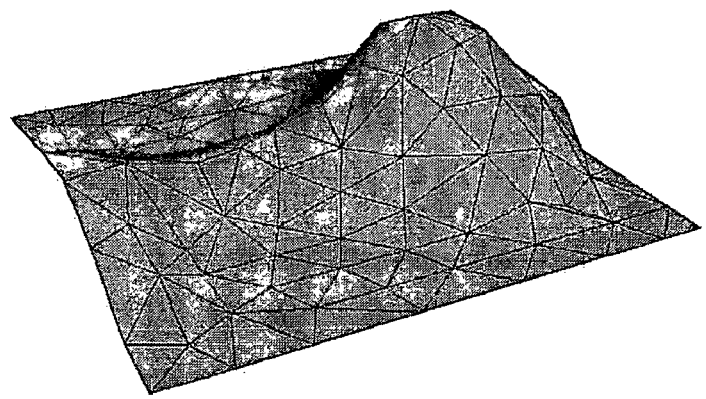
Figure 19C:
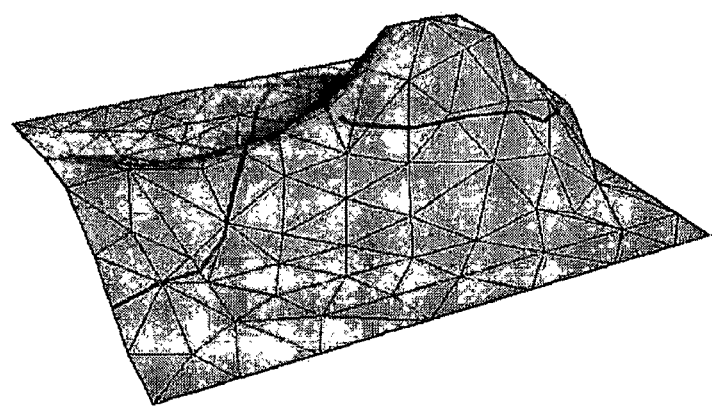

FIGS. 19A to 19C are views showing an example of three-dimensionally transforming two-dimensional linear data in accordance with three-dimensional topography data in real time and three-dimensionally visualizing the two-dimensional linear data together with the three-dimensional topography data in a case where the three-dimensional topography data is expressed in the DEM format. By outputting the three-dimensionally-transformed two-dimensional linear data shown in FIG. 19A together with the DEM three-dimensional topography data shown in FIG. 19B, the geographical features can be visualized three-dimensionally and perceived intuitively as shown in FIG. 19C.

Figure 20A:
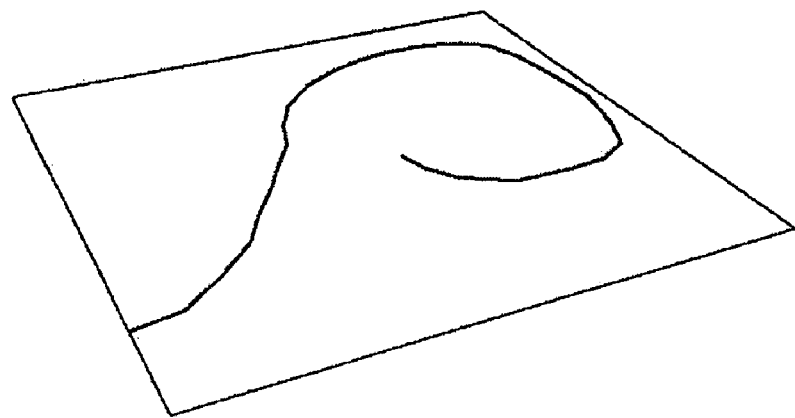
FIGS. 20A to 20C are views showing an example of three-dimensionally transforming two-dimensional linear data in accordance with three-dimensional topography data in real time and three-dimensionally visualizing the two-dimensional linear data together with the three-dimensional topography data in a case where the three-dimensional topography data is expressed in a TIN format.
Figure 20B:
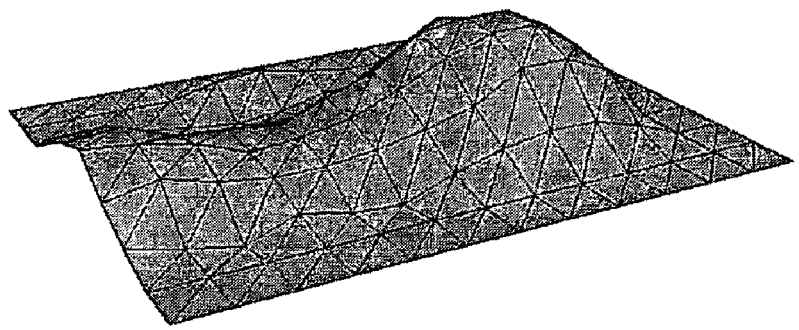
Figure 20C:
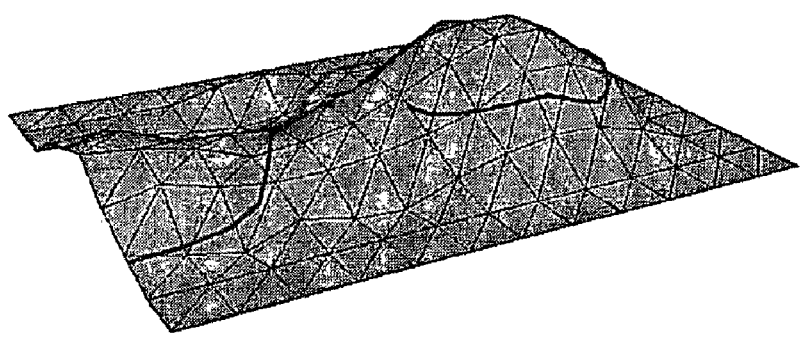

FIGS. 20A to 20C are views showing an example of three-dimensionally transforming two-dimensional linear data in accordance with three-dimensional topography data in real time and three-dimensionally visualizing the two-dimensional linear data together with the three-dimensional topography data in a case where the three-dimensional topography data is expressed in the TIN format. By outputting the three-dimensionally-transformed two-dimensional linear data shown in FIG. 20A together with the TIN three-dimensional topography data shown in FIG. 20B, the geographical features can be visualized three-dimensionally and perceived intuitively as shown in FIG. 20C.

According to the above-described embodiments, a method and apparatus for three-dimensionally transforming two-dimensional linear data in real time and a method and apparatus for three-dimensionally visualizing the two-dimensional linear data in real time, since the two-dimensional linear data is three-dimensionally transformed in accordance with three-dimensional topography data in real time and three-dimensionally visualized together with three-dimensional topography data in real time, map information can be perceived intuitively and conveniently by a user. In addition, when the three-dimensional topography data expressed in a digital elevation model (DEM) format is visualized, redundant points is not visualized, so that a rendering speed can be improved.

Embodiments of the present invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, and optical data storage devices.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

What is claimed is:

1. A method of three-dimensionally transforming two-dimensional linear data in accordance with three-dimensional topography data in real time, comprising:
    searching triangles in which vertexes constituting the two-dimensional linear data are contained among triangles constituting the three-dimensional topography data;
    calculating heights of the vertexes by using three-dimensional coordinates of the searched triangles;
    calculating intersection points between the triangles constituting the three-dimensional topography data and straight lines connecting the vertexes constituting the two-dimensional linear data; and
    calculating heights of the calculated intersection points.

2. The method according to claim 1, further comprising:
    determining an expression format of the three-dimensional topography data; and
    generating triangle strips containing coordinates of the triangles constituting the three-dimensional topography data when the expression format is a digital elevation model (DEM) format.

3. The method according to claim 1, wherein the calculating heights of the vertexes comprises:

obtaining a plane equation ax+by+cz+d=0 for a plane containing the searched triangles; and obtaining z coordinates corresponding to the heights of the vertexes by substituting x and y coordinates of the vertexes into the plane equation.

4. The method according to claim 3, wherein the obtaining a plane equation comprises:

selecting one of three angular points of each of the triangles;

obtaining vectors from the selected angular point of each of the triangles to the other two angular points of each of the triangles;

obtaining values of a, b, and c of the plane equation by calculating vector products of the obtained vectors; and obtaining the value of d of the plane equation by substituting the coordinates of the selected angular point in the plane equation.

5. The method according to claim 1, wherein the three-dimensional topography data is expressed by using a triangulated irregular network (TIN) format.

6. The method according to claim 5, wherein the searching triangles comprises:

calculating boundary rectangles in which respective triangles constituting three-dimensional topography data are inscribed;

searching at least one boundary rectangle containing the vertexes among the calculated boundary rectangles;

defining a triangle corresponding to the searched boundary rectangle as a vertex-containing triangle in which the vertex is contained, when the number of the searched boundary rectangles is one; and searching the vertex-containing triangle by determining whether or not the triangles corresponding to the boundary rectangles contain the vertex, when the number of the searched boundary rectangles is more than one.

7. The method according to claim 6, wherein the searching at least one boundary rectangle comprises:

arranging the searched boundary rectangles in an order of sizes of the x coordinates of the respective vertexes;

searching among the boundary rectangles arranged in an order of sizes of the x coordinates at least one of the boundary rectangles, the x coordinates of the vertexes being between the x coordinates of the vertexes;

arranging the searched boundary rectangles in an order of sizes of the y coordinates of the vertexes; and searching among the boundary rectangles arranged in an order of sizes of the y coordinates at least one of the boundary rectangles, the y coordinates of the vertexes being between the y coordinates of the corners of the boundary rectangles.

8. The method according to claim 5, wherein the calculating intersection points comprises:

calculating boundary rectangles in which respective triangles constituting the three-dimensional topography data are inscribed;

determining the boundary rectangles containing a portion of the straight line or the whole straight line; and calculating intersection points between the straight line and the triangle corresponding to the boundary rectangle.

9. The method according to claim 1, wherein the three-dimensional topography data is expressed by using a digital elevation model (DEM) format.

10. The method according to claim 9, wherein the calculating intersection points comprises:

determining x coordinates of end points of bases of the triangles constituting the three-dimensional topography data;

calculating y coordinates of the intersection points by substituting the x coordinates of the end points of the bases in a linear equation;

determining y coordinates of bases of the triangles constituting the three-dimensional topography data;

calculating x coordinates of the intersection points by substituting the y coordinates of the base in the linear equation; and obtaining two-dimensional coordinates of intersection points between hypotenuses of the triangles and each of the straight lines.

11. The method according to claim 10, further comprising arranging the calculated intersection points in an order of a distance from the calculated intersection point to one end point of the straight line.

12. The method according to claim 9, wherein the calculating heights of the calculated intersection points comprises calculating heights of the intersection points by performing an interpolation process using the coordinates of the vertexes of the triangles corresponding to the intersection points.

13. The method according to claim 9, further comprising calculating heights of the vertexes constituting the two-dimensional linear data by performing an interpolation process, wherein the vertexes exist outside cells constituting the three-dimensional topography data, and wherein the interpolation process is performed by using coordinates of angular points of a nearest cell of each of the vertexes constituting the two-dimensional linear data.

14. The method according to claim 1, wherein the two-dimensional linear data is data on a road, a railroad, or a river.

15. An apparatus for three-dimensionally transforming two-dimensional linear data in accordance with three-dimensional topography data in real time, comprising:

a triangle search unit searching triangles in which vertexes constituting the two-dimensional linear data are contained among triangles constituting the three-dimensional topography data;

a vertex height calculation unit calculating heights of the vertexes by using three-dimensional coordinates of the searched triangles;

an intersection point calculation unit calculating intersection points between the triangles constituting the three-dimensional topography data and straight lines connecting the vertexes constituting the two-dimensional linear data; and an intersection point height calculation unit calculating heights of the calculated intersection points.

16. The apparatus according to claim 15, further comprising:

a topography determination unit determining an expression format of the three-dimensional topography data; and a triangle strip generation unit generating triangle strips containing coordinates of the triangles constituting the three-dimensional topography data when the expression format is a digital elevation model (DEM) format.

17. The apparatus according to claim 15, wherein the vertex height calculation unit comprises:

a plane equation calculation unit obtaining a plane equation ax+by+cz+d=0 for a plane containing the searched triangles;

a z-coordinate calculation unit obtaining z coordinates corresponding to the heights of the vertexes by substituting x and y coordinates of the vertexes into the plane equation.

18. The apparatus according to claim 15, wherein the three-dimensional topography data is expressed by using a triangulated irregular network (TIN) format.

19. The apparatus according to claim 18, wherein the triangle search unit comprises:
a boundary rectangle calculation unit calculating boundary rectangles in which respective triangles constituting three-dimensional topography data are inscribed;
a boundary rectangle search unit searching at least one boundary rectangle containing the vertexes among the calculated boundary rectangles;
a triangle determination unit, when the number of the searched boundary rectangles is one, defining a triangle corresponding to the searched boundary rectangle as a vertex-containing triangle in which the vertex is contained and when the number of the searched boundary rectangles is more than one, searching the vertex-containing triangle by determining whether or not the triangles corresponding to the boundary rectangles contain the vertex.

20. The apparatus according to claim 19, wherein the boundary rectangle search unit comprises:
a first arrangement unit arranging the searched boundary rectangles in an order of sizes of the x coordinates of the vertexes;
a first search unit searching among the boundary rectangles arranged in an order of sizes of the x coordinates at least one of the boundary rectangles, the x coordinates of the vertexes being between the x coordinates of the vertexes; and
a second arrangement unit arranging the searched boundary rectangles in an order of sizes of the y coordinates of the vertexes;
a second search unit searching among the boundary rectangles arranged in an order of sizes of the y coordinates at least one of the boundary rectangles, the y coordinates of the vertexes being between the y coordinates of the corners of the vertexesboundary rectangles.

21. The apparatus according to claim 15, wherein the three-dimensional topography data is expressed by using a digital elevation model (DEM) format.

22. The apparatus according to claim 21, wherein the intersection point calculation unit comprises:
an x-coordinate determination unit determining x coordinates of end points of bases of the triangles constituting the three-dimensional topography data;
a y-coordinate calculation unit calculating y coordinates of the intersection points by substituting the x coordinates of the end points of the bases in a linear equation;
a y-coordinate determination unit determining y coordinates of bases of the triangles constituting the three-dimensional topography data;
an x-coordinate calculation unit calculating x coordinates of the intersection points by substituting the y coordinates of the base in the linear equation; and
a hypotenuse intersection point calculation unit obtaining two-dimensional coordinates of intersection points between hypotenuses of the triangles and each of the straight lines.

23. The apparatus according to claim 22, wherein the intersection point calculation unit arranges the calculated intersection points in an order of a distance from the calculated intersection point to one end point of the straight line.

24. The apparatus according to claim 21, wherein the arranging comprises calculating heights of the intersection points by performing an interpolation process using the coordinates of the vertexes of the triangles corresponding to the intersection points.

25. The apparatus according to claim 21, further comprising an outer vertex height calculation unit calculating heights of the vertexes constituting the two-dimensional linear data by performing an interpolation process,
wherein the vertexes exist outside cells constituting the three-dimensional topography data, and
wherein the interpolation process is performed by using coordinates of angular points of a nearest cell of each of the vertexes constituting the two-dimensional linear data.

26. The apparatus according to claim 15, wherein the two-dimensional linear data is data on a road, a railroad, or a river.

27. A method of three-dimensionally visualizing two-dimensional linear data together with three-dimensional topography data in real time, comprising:
searching triangles in which vertexes constituting the two-dimensional linear data are contained among triangles constituting the three-dimensional topography data;
calculating heights of the vertexes by using three-dimensional coordinates of the searched triangles;
calculating intersection points between the triangles constituting the three-dimensional topography data and straight lines connecting the vertexes constituting the two-dimensional linear data;
calculating heights of the calculated intersection points; and
outputting the two-dimensional linear data in a three-dimensional format by using the three-dimensional coordinates of the vertexes and the three-dimensional coordinates of the intersection points.

28. The method according to claim 27, further comprising:
determining an expression format of the three-dimensional topography data; and
generating triangle strips containing coordinates of the triangles constituting the three-dimensional topography data when the expression format is a digital elevation model (DEM) format.

29. The method according to claim 28, further comprising outputting all the coordinate values constituting the triangle strips to an output device at one time.

30. The method according to claim 27, wherein the calculating heights of the vertexes comprises:
obtaining a plane equation $ax+by+cz+d=0$ for a plane containing the searched triangles; and
obtaining z coordinates corresponding to the heights of the vertexes by substituting x and y coordinates of the vertexes into the plane equation.

31. The method according to claim 30, wherein the obtaining a plane equation comprises:
selecting one of three angular points of each of the triangles;
obtaining vectors from the selected angular point of each of the triangles to the other two angular points of each of the triangles;
obtaining values of a, b, and c of the plane equation by calculating vector products of the obtained vectors; and
obtaining the value of d of the plane equation by substituting the coordinates of the selected angular point in the plane equation.

32. The method according to claim 27, wherein the three-dimensional topography data is expressed by using a triangulated irregular network (TIN) format.

33. The method according to claim 32, wherein the searching triangles comprises:
- calculating boundary rectangles in which respective triangles constituting three-dimensional topography data are inscribed;
- searching at least one boundary rectangle containing the vertexes among the calculated boundary rectangles;
- defining a triangle corresponding to the searched boundary rectangle as a vertex-containing triangle in which the vertex is contained, when the number of the searched boundary rectangles is one; and
- searching the vertex-containing triangle by determining whether or not the triangles corresponding to the boundary rectangles contain the vertex, when the number of the searched boundary rectangles is more than one.

34. The method according to claim 33, wherein the searching at least one boundary rectangle comprises:
- arranging the searched boundary rectangles in an order of sizes of the x coordinates of the vertexes;
- searching among the boundary rectangles arranged in an order of sizes of the x coordinates at least one of the boundary rectangles, the x coordinates of the vertexes being between the x coordinates of the vertexes;
- arranging the searched boundary rectangles in an order of sizes of the y coordinates of the vertexes; and
- searching among the boundary rectangles arranged in an order of sizes of the y coordinates at least one of the boundary rectangles, the y coordinates of the vertexes being between the y coordinates of the corners of the boundary rectangles.

35. The method according to claim 32, wherein the calculating intersection points comprises:
- calculating boundary rectangles in which respective triangles constituting the three-dimensional topography data are inscribed;
- determining the boundary rectangles containing a portion of the straight line or the whole straight line; and
- calculating intersection points between the straight line and the triangle corresponding to the boundary rectangle.

36. The method according to claim 27, wherein the three-dimensional topography data is expressed by using a digital elevation model (DEM) format.

37. The method according to claim 36, wherein the calculating intersection points comprises:
- determining x coordinates of end points of bases of the triangles constituting the three-dimensional topography data;
- calculating y coordinates of the intersection points by substituting the x coordinates of the end points of the bases in a linear equation;
- determining y coordinates of bases of the triangles constituting the three-dimensional topography data;
- calculating x coordinates of the intersection points by substituting the y coordinates of the base in the linear equation; and
- obtaining two-dimensional coordinates of intersection points between hypotenuses of the triangles and each of the straight lines.

38. The method according to claim 37, further comprising arranging the calculated intersection points in an order of a distance from the calculated intersection point to one end point of the straight line.

39. The method according to claim 36, wherein the calculating heights of the calculated intersection points comprises calculating heights of the intersection points by performing an interpolation process using the coordinates of the vertexes of the triangles corresponding to the intersection points.

40. The method according to claim 36, further comprising calculating heights of the vertexes constituting the two-dimensional linear data by performing an interpolation process,
- wherein the vertexes exist outside cells constituting the three-dimensional topography data, and
- wherein the interpolation process is performed by using coordinates of angular points of a nearest cell of each of the vertexes constituting the two-dimensional linear data.

41. The method according to claim 27, wherein the two-dimensional linear data is data on a road, a railroad, or a river.

42. An apparatus for three-dimensionally visualizing two-dimensional linear data together with three-dimensional topography data in real time, comprising:
- a triangle search unit searching triangles in which vertexes constituting the two-dimensional linear data are contained among triangles constituting the three-dimensional topography data;
- a vertex height calculation unit calculating heights of the vertexes by using three-dimensional coordinates of the searched triangles;
- an intersection point calculation unit calculating intersection points between the triangles constituting the three-dimensional topography data and straight lines connecting the vertexes constituting the two-dimensional linear data;
- an intersection point height calculation unit calculating heights of the calculated intersection points; and
- a data output unit storing the three-dimensional coordinates of the vertexes and the three-dimensional coordinates of the intersection points and outputting the two-dimensional linear data as a three-dimensional format by using the three-dimensional coordinates of the vertexes and the three-dimensional coordinates of the intersection points.

43. The apparatus according to claim 42, further comprising:
- a topography determination unit determining an expression format of the three-dimensional topography data; and
- a triangle strip generation unit generating triangle strips containing coordinates of the triangles constituting the three-dimensional topography data if the expression format is a digital elevation model (DEM) format.

44. The apparatus according to claim 43, wherein the data output unit comprises a triangle coordinate output unit outputting all the coordinate values constituting the triangle strips to an output device at one time.

45. The apparatus according to claim 42, wherein the vertex height calculation unit comprises:
- a plane equation calculation unit obtaining a plane equation $ax+by+cz+d=0$ for a plane containing the searched triangles; and
- a z-coordinate calculation unit obtaining z coordinates of the vertexes by substituting x and y coordinates of the vertexes into the plane equation.

46. The apparatus according to claim 42, wherein the three-dimensional topography data is expressed by using a triangulated irregular network (TIN) format.

47. The apparatus according to claim 46, wherein the triangle search unit comprises:
- a boundary rectangle calculation unit calculating boundary rectangles in which respective triangles constituting three-dimensional topography data are inscribed;

a boundary rectangle search unit searching at least one boundary rectangle containing the vertexes among the calculated boundary rectangles; and a triangle determination unit, when the number of the searched boundary rectangles is one, defining a triangle corresponding to the searched boundary rectangle as a vertex-containing triangle in which the vertex is contained and when the number of the searched boundary rectangles is more than one, searching the vertex-containing triangle by determining whether the triangles corresponding to the boundary rectangles contain the vertex.

48. The apparatus according to claim 47, wherein the boundary rectangle search unit comprises:

a first arrangement unit arranging the searched boundary rectangles in an order of sizes of the x coordinates of the vertexes;

a first search unit searching among the boundary rectangles arranged in an order of sizes of the x coordinates at least one of the boundary rectangles, the x coordinates of the vertexes being between the x coordinates of the vertexes;

a second arrangement unit arranging the searched boundary rectangles in an order of sizes of the y coordinates of the verteies; and a second search unit searching among the boundary rectangles arranged in an order of sizes of the y coordinates at least one of the boundary rectangles, the y coordinates of the vertexes being between the y coordinates of the corners of the boundary rectangles.

49. The apparatus according to claim 42, wherein the three-dimensional topography data is expressed by using a digital elevation model (DEM) format.

50. The apparatus according to claim 49, wherein the intersection point calculation unit comprises:

an x-coordinate determination unit determining x coordinates of end points of bases of the triangles constituting the three-dimensional topography data;

a y-coordinate calculation unit calculating y coordinates of the intersection points by substituting the x coordinates of the end points of the bases in a linear equation;

a y-coordinate determination unit determining y coordinates of bases of the triangles constituting the three-dimensional topography data;

an x-coordinate calculation unit calculating x coordinates of the intersection points by substituting the y coordinates of the base in the linear equation; and a hypotenuse intersection point calculation unit obtaining two-dimensional coordinates of intersection points between hypotenuses of the triangles and each of the straight lines.

51. The apparatus according to claim 50, wherein the intersection point calculation unit arranges the calculated intersection points in an order of a distance from the calculated intersection point to one end point of the straight line.

52. The apparatus according to claim 49, wherein the arranging comprises calculating heights of the intersection points by performing an interpolation process using the coordinates of the vertexes of the triangles corresponding to the intersection points.

53. The apparatus according to claim 49, further comprising an outer vertex height calculation unit calculating heights of the vertexes constituting the two-dimensional linear data by performing an interpolation process, wherein the vertexes exist outside cells constituting the three-dimensional topography data, and wherein the interpolation process is performed by using coordinates of angular points of a nearest cell of each of the vertexes constituting the two-dimensional linear data.

54. The apparatus according to claim 42, wherein the two-dimensional linear data is data on a road, a railroad, or a river.

55. A computer-readable medium having embodied thereon a computer program for a method of three-dimensionally transforming two-dimensional linear data in accordance with three-dimensional topography data in real time, the method comprising:

searching triangles in which vertexes constituting the two-dimensional linear data are contained among triangles constituting the three-dimensional topography data;

calculating heights of the vertexes by using three-dimensional coordinates of the searched triangles;

calculating intersection points between the triangles constituting the three-dimensional topography data and straight lines connecting the vertexes constituting the two-dimensional linear data; and calculating heights of the calculated intersection points.

56. A computer-readable medium having embodied thereon a computer program for a method of three-dimensionally transforming two-dimensional linear data in accordance with three-dimensional topography data in real time, the method comprising:

searching triangles in which vertexes constituting the two-dimensional linear data are contained among triangles constituting the three-dimensional topography data;

calculating heights of the vertexes by using three-dimensional coordinates of the searched triangles;

calculating intersection points between the triangles constituting the three-dimensional topography data and straight lines connecting the vertexes constituting the two-dimensional linear data;

calculating heights of the calculated intersection points; and outputting the two-dimensional linear data as a three-dimensional format by using the three-dimensional coordinates of the vertexes and the three-dimensional coordinates of the intersection points.

* * * * *

UNITED STATES PATENT AND TRADEMARK OFFICE
CERTIFICATE OF CORRECTION

PATENT NO. : 7,411,587 B2  Page 1 of 1
APPLICATION NO. : 11/200197
DATED : August 12, 2008
INVENTOR(S) : Shinjun Lee et al.

It is certified that error appears in the above-identified patent and that said Letters Patent is hereby corrected as shown below:

Column 17, Line 42, change "vertexesboundary" to --boundary--.

Column 21, Line 24, change "verteies;" to --vertexes;--.

Signed and Sealed this

Eleventh Day of November, 2008

JON W. DUDAS
*Director of the United States Patent and Trademark Office*